(12) United States Patent
ElBatt et al.

(10) Patent No.: US 7,570,593 B1
(45) Date of Patent: Aug. 4, 2009

(54) INTERFERENCE-RESILIENT JOINT MAC AND ROUTING SCHEME FOR WIRELESS AD-HOC NETWORKS

(75) Inventors: Tamer ElBatt, Woodland Hills, CA (US); Timothy Andersen, Troy, NY (US)

(73) Assignee: HRL Laboratories, LLC, Malibu, CA (US)

( * ) Notice: Subject to any disclaimer, the term of this patent is extended or adjusted under 35 U.S.C. 154(b) by 1 day.

(21) Appl. No.: 10/883,649

(22) Filed: Jun. 30, 2004

Related U.S. Application Data

(60) Provisional application No. 60/484,144, filed on Jun. 30, 2003.

(51) Int. Cl.
*G01R 31/08* (2006.01)
(52) U.S. Cl. .................. 370/238; 455/445; 455/63.1; 370/338
(58) Field of Classification Search .............. 370/328, 370/469
See application file for complete search history.

(56) References Cited

U.S. PATENT DOCUMENTS

| 6,754,222 B1 * | 6/2004 | Joung et al. ............... 370/412 |
| 2007/0268880 A1 * | 11/2007 | Bellur et al. ............... 370/338 |

OTHER PUBLICATIONS

"Wireless LAN Medium Access Control (MAC) and Physical Layer (PHY) specifications," 1997. Draft Standard IEEE 802.11, P802.11/DI: The editors of IEEE 802.11.

V. Bhargavan, A. Demers, S. Shenker, and L. Zhang, "MACAW—A media access protocol for Wireless LANs", Proc. ACM SIGCOMM, Sep. 1994.

F. Tobagi and L. Kleinrock "Packet Switching in Radio Channels: Part II-The hidden terminal problem in carrier sense multiple-access and the busy-tone solution," IEEE Transactions on Communications, vol. 23, pp. 1417-1433, Dec. 1975.

Z. Haas and J. Deng "Dual Busy Tone Multiple Access (D8TMA)- A Multiple Control Scheme for Ad Hoc Networks," IEEE Transactions on Communications, vol. 50, No. 6, pp. 975-985, Jun. 2002.

I. Chlamtac and S. Kutten "A Spatial Reuse TDMA/FDMA for Mobile Multi-hop Radio Network," Proc. IEEE INFOCOM, 1985.

A. Ephremides, J. Wieselthier and D. Baker "A Design Concept for Reliable Mobile Radio Networks with Frequency Hopping Signaling," Proc. IEEE, vol. 75, No. 1, pp. 56-73, Jan. 1987.

(Continued)

*Primary Examiner*—Rafael Pérez-Gutiérrez
*Assistant Examiner*—Marcos Batista
(74) *Attorney, Agent, or Firm*—Tope-McKay & Assoc.

(57) ABSTRACT

The present invention provides a cross-layer design framework for the multiple access and routing problems in interference-limited wireless ad-hoc networks. It identified interference as an essential factor that couples multiple access and routing decisions through the trade-off between MAC throughput and path length. It formulates an optimization problem that maximizes the multiple access throughputs subject to constraints on the path length, single-to-interference-and-noise-ratio, and transmission power. It incorporates interference into the routing metric and reduces problem complexity via the set-based routing concept that solves the problem for a set of spatially close source nodes. Accordingly, the present invention introduces a joint routing, scheduling and power control algorithm that handles intra-set interference. In addition, it adopted a simple set coordination scheme for handling inter-set interference.

16 Claims, 10 Drawing Sheets

OTHER PUBLICATIONS

I. Chlamtac and S. Pinter "Distributed Nodes Organization Algorithm for Channel Access in a Multi-hop Dynamic Radio Network," IEEE Transactions on Computers, vol. 36, pp. 728-737, 1987.

I. Cidon and M. Sidi "Distributed Assignment Algorithms for Multihop Packet Radio Networks," IEEE Transactions on Computers, vol. 38, No. 10, pp. 1353-1361, Oct. 1989.

L. Pond and V. Li "A Distributed Time-slot Assignment Protocol for Mobile Multi-hop Broadcast Packet Radio Networks," Proc. IEEE MILCOM, 1989.

R. Ramaswami and K. Parhi "Distributed Scheduling of Broadcasts in a Radio Network," Proc. IEEE INFOCOM, 1989.

A. Ephremides and T. Truong "Scheduling Broadcasts in Multihop Radio Networks," IEEE Transactions on Communications, vol. 38, No. 4, pp. 456-460, Apr. 1990.

S. Ramanathan and E. Lloyd "Scheduling Algorithms for Multihop Radio Networks," IEEE/ACM Transactions on Networking, vol. 1, No. 2, pp. 166-177, 1993.

R. Rozovsky and P.R. Kumar "SEEDEX: A MAC Protocol for Ad Hoc Networks," Proc. ACM MOBIHOC, Oct. 2001.

C. Perkins and P. Bhagwat "Highly Dynamic Destination-Sequenced Distance-Vector routing (DSDV) for Mobile Computers," Proc. ACM SIGCOMM, 1994.

C. Perkins and E. Royer "Ad-hoc On-Demand Distance Vector Routing," Proc. 2nd IEEE Workshop on Mobile Computing Systems and Applications, Feb. 1999.

D. Johnson, D. Maltz and J. Broch "The Dynamic Source Routing Protocol for Multihop Wireless Ad Hoc Networks," Ad Hoc Networking, edited by Charles Perkins, Chapter 5, pp. 139-172. Addison-Wesley, 2001.

E. Royer and C-K. Toh "A Review of Current Routing Protocols for Ad-Hoc Mobile Wireless Networks," IEEE Personal Communications Magazine, vol. 6, No. 2, pp. 46-55, Apr. 1999.

S. Singh, M. Woo and C.S. Raghavendra "Power-Aware Routing in Mobile Ad hoc Networks," Proc. ACM/IEEE MOBICOM, pp. 181-190,, Oct. 1998.

R. Dube et al. "Signal Stability-Based Adaptive Routing (SSA) for Ad Hoc Mobile Networks," IEEE Personal Communications Magazine, pp. 36-45, Feb. 1997.

M. Pursley, H. Russell and P. Staples "Routing for Multimedia Traffic in Wireless Frequency-Hop Communication Networks," IEEE Journal on Selected Areas in Communications, vol. 17, No. 5, May 1999.

J. Chang and L. Tassiulas "Energy Conserving Routing in Wireless Ad hoc Networks," Proc. IEEE INFOCOM, Apr. 2000.

A. Michail and A. Ephremides, "Energy efficient routing for connection-oriented traffic in ad-hoc wireless networks", Proc. IEEE PIMRC, vol. 2, 2000.

J. Monks, V. Bharghavan and W. Hwu "A Power Controlled Multiple Access Protocol for Wireless Packet Networks," Proc. IEEE INFOCOM, Apr. 2001.

G. Holland and N. Vaidya "A Rate Adaptive MAC Protocol for Multi-hop Wireless Networks," Proc. ACM MOBICOM, 2001.

B. Sadeghi, V. Kanodia, A. Sabharwal and E. Knightly "Opportunistic Media Access for Multirate Ad Hoc Networks," Proc. ACM-MOBICOM, 2002.

T. ElBatt and A. Ephremides "Joint Scheduling and Power Control for Wireless Ad-hoc Networks" Proc. IEEE INFOCOM, Jun. 2002.

C. Barret et al., "Characterizing the Interaction Between Routing and MAC Protocols in Ad hoc Networks," Proc. ACM MOBIHOC, Jun. 2002.

B. Radunovic and J. Le Boudec "Joint Scheduling, Power Control and Routing in Symmetric, One-dimensional Multi-hop \\Tireless Networks," Proc. WiOpt'03: Modeling and Optimization in Mobile, Ad Hoc and Wireless Networks, Mar. 2003.

T. Girici and A. Ephremides "Joint Routing and Scheduling Metrics in Wireless Ad Hoc Networks," Proc. 36'h Asilomar Conference on Signals, Systems and Computers, Nov. 2002.

R. Cruz and A. Santhanam "Optimal Routing, Link Scheduling and Power Control and Multi-hop Wireless Networks," Proc. IEEE INFOCOM, Apr. 2003.

A. Muqattash and M. Krunz "Power Controlled Dual Channel (PCDC) Medium Access Protocol for Wireless Ad Hoc Networks," Proc. IEEE INFOCOM, Apr. 2003.

V. Kawadia and P. Kumar "Power Control and Clustering in Ad Hoc Networks," Proc. IEEE INFOCOM, Apr. 2003.

M. Neely and E. Modiano "Dynamic Power Allocation and Routing for Time Varying Wireless Networks," Proc. IEEE INFOCOM, Apr. 2003.

S. Basagni, I. Chlamtac and V. Syrotiuk "Geographic Messaging in Wireless Ad Hoc Networks," Proc. IEEE VTC, 1999.

L. Williams "Technology Advances from Small Unit Operations Situation Awareness System Development," IEEE Personal Communications Magazine, pp. 30-33, Feb. 2001.

M. Mauve, J. Widmer and H. Hartenstein "A Survey on Position-Based Routing in Mobile Ad Hoc Networks," IEEE Network, pp. 30-39, Nov./Dec. 2001.

L. Kleinrock and J. Silvester "Optimum transmission radii packet radio networks or why six is a magic number," Proc. IEEE National Telecommunications Conference, pp. 4.3.1-4.3.6, Dec. 1978.

T. Hou and V. Li "Transmission Range Control in Multihop Packet Radio Networks," IEEE Transactions on Communications, vol. 34, No. 1, pp. 38-44, Jan. 1986.

T. ElBatt, S. Krishnamurthy, D. Connors and S. Dao "Power Management for Throughput Enhancement in Wireless Ad Hoc Networks," Proc. IEEE ICC, 2000.

R. Ramanathan and R. Rosales-Hain "Topology Control of Multihop Wireless Networks using Transmit Power Adjustment," Proc. IEEE INFOCOM, 2000.

* cited by examiner

INTERFERENCE-RESILIENT JOINT MAC AND ROUTING SCHEME FOR WIRELESS AD-HOC NETWORKS

CROSS-REFERENCE TO RELATED APPLICATION

The present application claims priority from related U.S. Provisional Patent Application Ser. No. 60/484,144, filed Jun. 30, 2003, the entire disclosure of which is incorporated herein by reference.

BACKGROUND OF THE INVENTION (1) Field of the Invention

This invention relates to joint MAC and routing schemes for wireless ad-hoc networks. More specifically, this invention relates to joint MAC, routing, and power schemes that consider problems associated with interference.

(2) Description of Related Art

Open Systems Interconnection (OSI) is a well-known standard description or "reference model" for how messages should be transmitted between any two points in a communication network and is available in numerous publications, including a book by Andrew S. Tanenbaum titled "Computer Networks," second edition, Prentice-Hall, Inc., 1988 (hereinafter Tanenbaum). The main idea in OSI is that the process of communication between two end points in a communication network can be divided into layers, with each layer adding its own set of special, related functions. As illustrated in the prior art FIG. 1, the OSI divides communication into seven layers. The upper four layers are used whenever a message passes from or to a user and the lower three layers (up to the network layer) are used when any message passes through the host system. Messages intended for the host system pass to the upper layers, and messages destined for some other host are not passed to the upper layers but, instead, are forwarded to another host.

The first (physical) layer 1 is concerned with transmitting raw bits over a communication channel. This layer 1 defines the electrical and other physical characteristics of the network such as voltage, current, and power levels for transmission of actual raw data, data rates, maximum transmission distance, etc. Typical design issues for this layer 1 deal with power requirements to transmit information, how many microseconds a bit lasts, whether transmission may proceed simultaneously in both directions, how the initial connection is established and how the connection is torn down when both sides are finished.

The main task of the Data Link layer 2 is to take a raw transmission facility and transform it into a line that appears free of transmission errors to the network layer 3. This task is accomplished by having the sender break the input data up into data frames, transmit the frames sequentially, and process the acknowledged frames sent back by the receiver. Since the physical layer 1 merely accepts and transmits a stream of bits without any regard to meaning or structure, it is up to the data link layer 2 to create and recognize frame boundaries. As illustrated in prior art FIG. 2, the Data Link layer 2 divides into two well-known sub-layers, a Logic Link Control (LLC) sub-layer 202 and a Medium Access Control (MAC) sub-layer 200. The LLC sub-layer 202 manages communication between devices over a single line of a network. The MAC sub-layer 200 manages access to the physical network medium. The Institute of Electrical and Electronics Engineers (IEEE) MAC specification defines MAC addresses, which enable multiple devices to identify one another at the data link layer 2. The last layer discussed in detail is the network layer 3 (layer 3 in OSI) that defines the network address, which differs from the MAC address. The network layer 3 is concerned with getting packets from the source all the way to the destination. It is the lowest layer that deals with end-to-end transmission.

The prior art FIG. 3 shows an example of how data can be transmitted using OSI model. The seven OSI layers use various forms of control information (the headers) to communicate with their peer layers in other systems. This control information is comprised of specific requests and instructions, exchanged between peer OSI layers. The details of all the layers and their respective communication protocols are well-known. However, the instant invention will consider layers one to three in more details. As illustrated in both FIGS. 1 and 3, a frame is an information unit (a unit of exchange) whose source and destination are data link layer 2 entities. A frame (generally measured in units of time) is composed of the data link layer header 304 (and possibly a trailer) and upper-layer data. The header 304 and trailer (not shown) contain control information intended for the data link layer 2 entity in the destination system. Data from upper-layer entities (Packets from Network Layer 3) encapsulate in the data link layer header 304 and trailer (not shown). A packet is an information unit whose source and destination are network layer 3 entities. A packet is composed of the network layer header 302 (and possibly a trailer—not shown) and upper-layer data. The header 302 and trailer contain control information intended for the network layer 3 entity in the destination system. Data from upper-layer entities encapsulate in the network layer 3 header 302 and trailer. Exchange unit for layer 1 is a bit, layer 2 exchange unit is a frame, layer 3 exchange unit is a packet, layer 4 exchange unit is a Transport Protocol Data Unit (TPDU), layer 5 exchange unit is a Session Protocol Data Unit (SPDU), layer 6 exchange unit is a Presentation Protocol Data Unit (PPDU), and layer 7 exchange unit is an Application Protocol Data Unit (APDU).

The problem with the OSI model is the study, research, and implementation of layers in isolation. On one hand, major work has been devoted to maximizing spatial reuse while minimizing interference (collisions) that may arise at various receivers. This, in turn, involves preventing primary and secondary interference in addition to handling the hidden and exposed terminal problems. MAC schemes (layer 2) for ad-hoc networks can be broadly classified into contention-based and reservation-based schemes. Under the former classification, carrier sense multiple access (CSMA), carrier sense multiple access with collision avoidance (CSMA/CA), and other collision avoidance mechanisms have been extensively studied and evaluated. In addition, others, such as, busy tone multiple access schemes introduced in various publications have attempted to solve the hidden and exposed terminal problems. Under the reservation-based class, scheduling non-conflicting transmissions in a distributed fashion has been the focal point of various other studies. However, the aforementioned schemes are confined to layer 2 in the International Standards Organization (ISO) OSI protocol stack and do not address the interaction and trade-off with (or across) higher and lower layers. For instance, none of the above schemes address the impact of power and data rate control at the physical layer 1 on the MAC decision taken at the layer 2. Moreover, the interaction between the MAC and routing layers decisions is not investigated.

In general, the use of multi-hop paths to transport data between source and destination nodes has been shown to enhance the network capacity. Research efforts in the routing arena (multi-hop routing in wireless networks) have been focused primarily in the following two directions: i) efficient route discovery/maintenance under mobility conditions and topology changes and ii) modifying the routing/link metric to match a wide variety of objectives (i.e., performance requirements). Most of the protocols developed along the former research direction (i) adopt the shortest path (SP) routing criteria widely employed in wireline networks. Along the second research direction (ii), considerable attention has been given to modifying the routing metric to meet different requirements. For instance, the proposed class of energy efficient routing metrics is targeted to evenly distribute the network load among nodes according to their residual battery charges in order to increase the network lifetime. In other studies, the routing criteria incorporate the received signal strength so those routes with stable links are favored over routes with vulnerable links. Finally, other studies introduced a least-resistance routing metric for frequency hopping ad-hoc networks. However, studies relying on signal strength or least-resistance routing metrics did not consider the interference-induced coupling between the MAC layer and routing layer decisions.

Recently, the interactions between various layers in the OSI stack have started to receive some attention, including, for example, the role of power and rate control (physical layer) in improving the CSMA/CA (data link layer) throughput performance. Introducing power control to CSMA/CA was targeted at improving the network capacity by achieving denser spatial reuse and the rate control was used to exploit the wireless channel conditions such that the rate could increase when the channel condition was good and decreased when poor.

There have also been few attempts to couple MAC layer protocol design to routing layer, which include interactions between the two layers under different mobility models. The results indicated were two-fold: i) the performance varies depending on the traffic type and mobility patterns and ii) there is no "absolute winner" for the routing/MAC combination. More recently, some efforts have been devoted to coupling routing, scheduling, and physical layer design in wireless ad-hoc networks. The work done by Cruz et al. in a publication titled "Optimal Routing, Link Scheduling and Power Control in Multi-hop Wireless Networks," PROC. IEEE INFOCOM, April 2003 (hereinafter the Cruz et al. article), the entire disclosure of which is incorporated herein by reference, addresses some of the problems of joint routing, scheduling, and power control to support high data rates in wireless multi-hop networks. Although the work done formulates some joint scheduling and power control as an optimization problem, the optimum is determined for given topology and data rate requirements over each link. That is, using the Gaussian approximation for interference, the Cruz et al. article characterizes the optimal scheduling and power control policy that minimizes the total average transmission power subject to constraints on the link data rates and peak power per node. This facilitates the use of shortest-path (SP) routing with a link metric derived from the multiple access problem formulation. Other studies address the same problem in the context of symmetric one-dimensional multi-hop networks with the objective of finding the policy that achieves max-min fair rate allocation.

Joint routing and scheduling metrics for wireless ad-hoc networks that attempt to balance the trade-off between energy consumption and delay are also introduced in some studies. Others use a separate control channel to emphasize the interplay between MAC and routing through power control. Finally, the set of all data rates that stabilizes a network of time-varying wireless links, characterized by rate-power functions that incorporate interference, has also been studied by Neely et al. in a publication titled "Dynamic Power Allocation and Routing for Time Varying Wireless Networks," Proc. IEEE INFOCOM, April 2003, the entire disclosure of which is incorporated herein by reference. Moreover, a joint routing and power allocation strategy that offers delay guarantees has also been developed.

However, a cross-layer framework for multiple access and routing design in wireless ad-hoc networks that addresses the role of multi-user interference is not addressed by the prior art. Therefore, there is a need to modify a link metric in view of multi-user interference. In state of the art ad-hoc networks, the routing decision is completely independent from the MAC decision. Thus, the routing decision could potentially lead to degrading the performance of the multiple access protocol, which eventually leads to degrading the end-to-end network throughput. Most routing algorithms introduced for wireless ad-hoc networks rely on the classical shortest-path (SP) or minimum-hop (MH) routing criteria. Although these routing criteria could be attractive from the point of view of network throughput and end-to-end delays, they have a fundamental limitation in wireless networks. This limitation stems from the fact that each source-destination pair compute SP or MH routes independently. They do not take into consideration the relation and interaction among the chosen paths or the amount of multi-user interference a certain path may introduce to the receivers on other paths. That is, this routing criterion ignores the possibility of network congestion induced by multi-user interference coupling between spatially close links. Hence, the prior art overlooks the effect of routing decisions on the performance of multiple access algorithms. The prior art has focused primarily on improving the end-to-end throughput via reducing path lengths that primarily use SP routing algorithms.

In light of the current state of the art and the drawbacks to current systems mentioned above, a general need exists for a system and a method that would address the interaction and trade-off with (or across) higher and lower layers of the wireless OSI network communication. More specifically, a need exists for a system and a method that would address the role of multi-user interference within the environment of the cross-layer framework for multiple access and routing design in wireless ad-hoc networks.

SUMMARY OF THE INVENTION

Unlike wireline networks, the network topology in wireless ad-hoc networks is time varying and controllable, even if the nodes are stationary. Thus, the routing problem should not be solved for a given network topology as done in wireline networks. The present invention addresses the routing and power control (which defines the network topology) problems jointly. In addition, it uses the same cross-layer design concept to reduce interference coupling among various links by jointly considering the routing and MAC interaction.

The present invention provides a method for a joint approach that considers multiple access performance in view of routing decision by introducing a unified multiple access and routing framework for wireless ad-hoc networks that also takes into consideration the impact of interference. The present invention selects routes based on the path length in addition to their multiple access performance (measured in terms of the single-hop throughput). The present invention therefore addresses the trade-off between two factors that determine the end-to-end network throughput, namely path length and single-hop MAC throughput, both in view of interference.

The present invention identifies multi-user interference as a key factor that couples the MAC and routing decisions through the trade-off between MAC throughput and path length, and introduces a novel set-based routing concept that incorporates the impact of multi-user interference into the routing decision of spatially close transmitters, which reduces the complexity of the problem. Given a set of source-destination (S-D) pairs, the joint design of routing and multiple access algorithm determines the routing, scheduling, and power control policies that maximize the multiple access throughput subject to constraints on the multi-hop path length, signal-to-interference-and-noise-ratio (SINR), and transmission power. Accordingly, the proposed algorithm is responsible for deciding i) the best next-hop for each source on its route to the final destination, ii) the slot assigned for establishing the link between each source and its respective next-hop, and finally, iii) the transmission power used by the source node to guarantee successful reception at the next-hop. The first task directly relates to the routing decision whereas the latter two tasks relate to multiple access and power control decisions, respectively.

Motivated by the challenge of incorporating interference into the routing metric along with the sheer complexity of solving the problem over the entire network, the present invention solves it for groups of spatially close sources (referred to as "sets"). The present invention introduces a novel joint MAC-Routing concept that can improve the end-to-end network throughput. The present invention routes groups of spatially close links (referred to as a set) concurrently rather than independently. Accordingly, the present invention provides an algorithm that i) constructs interference-coupled transmitters (ICT) sets, ii) resolves intra-set interference via the joint routing, scheduling and power control algorithm and iii) resolves potential interference among overlapping sets via set coordination schemes. Hence, the present invention also provides a novel joint MAC and routing algorithm for detouring uni-cast packets around high interference hot spots of the network. The salient feature of the proposed algorithm is to improve the end-to-end network throughput while maintaining simplicity, scalability, and distributed operation.

Unlike SP routing, where all source-destination pairs are routed independently, the proposed algorithm reduces the interference that a path may introduce to another path. This, in turn, increases the number of successful transmissions simultaneously packed in the same slot. The algorithm also balances the trade-off between the single-hop MAC throughput and multi-hop path length. This feature is of paramount importance to improve the end-to-end network throughput. Finally, the algorithm reduces the transmission power consumption by using the minimum power needed to guarantee that the signal-to-interference-and-noise ratio (SINR) at the intended receiver is greater than a threshold necessary for successful reception.

Furthermore, the present invention provides a conducted simulation study that compares the cross-layer design approach to a reference system where MAC and routing decisions are independent. Results confirm the trade-off between MAC throughput and path length in wireless ad-hoc networks. The reference system simply ignores this trade-off since routing decisions are based solely on path length, whereas the proposed algorithm yields considerable end-to-end throughput improvement via incorporating interference in the design of network layer protocols. Finally, the present invention opens room for performance improvement through the introduction of more efficient set construction and coordination schemes.

One aspect of the present invention provides both a system and a method for an interference-resilient joint MAC, routing, and power scheme, comprising the acts of: providing an interference-resilient wireless ad-hoc communication network with K transmitter-receiver nodes, with each node having a unique index identification 1 to K, and comprising at least one antenna that communicates through wireless medium; providing a cross-layer framework that includes a joint routing, scheduling, and power control of respective network layer, data link layer, and physical layer of the communication network; optimizing Medium Access Control sub-layer (MAC) of the data link layer by formulating a multi-objective optimization problem with the MAC throughput as a primary objective and average path length formulated as a constraint as follows:

$$\max \eta_{mac}$$

$$NH, SL, P_t'$$

where K is an integer; $\eta_{mac}$ is the MAC throughput; NH constitutes a routing decision; SL constitutes a scheduling decision; and $P_t$ constitutes a power control decision.

Another aspect of the present invention provides a method for interference-resilient joint MAC, routing, and power scheme wherein the MAC throughput is measured as an average number of successful transmissions per slot.

Still another aspect provides a method for interference-resilient joint MAC, routing, and power scheme wherein the act of optimizing is subject to routing decision constraints,

| | |
|---|---|
| (a) $NH(S_k) \in N(S_k)$ | $\forall S_k$ |
| (b) $L \leq \beta$ | $\forall S_k$ | with the constraint (a) indicating that a next-hop transmission of any source should be among the source's neighbors, and constraint (b) limiting a routing decision space to include only source-destination paths of length no greater than a threshold $\beta$, and where $S_K$ is a source node K $NH(S_K) = \{NH(S_1), NH(S_2), \ldots, NH(S_K)\}$ is a vector of next-hop nodes for all source nodes; L is a length of a path from $S_k$ to $D_k$ passing through $NH(S_k)$ measured in number of hops and averaged over all source-destination pairs; $\beta$ is an upper bound on an average path length; and $N(S_k)$ is a set of single-hop neighborhood node K.

Yet another aspect provides a method for interference-resilient joint MAC, routing, and power scheme wherein the routing decision is constrained to include only loop-free paths.

A further aspect provides a method for interference-resilient joint MAC, routing, and power scheme wherein the act of optimizing is subject to scheduling decision constraints,

| | |
|---|---|
| (c) $SL_k = SL_j \Rightarrow NH(S_k) \neq S_j$ and $NH(S_j) \neq S_k$ | $\forall k,j$ |
| (d) $SL_k = SL_j \Rightarrow NH(S_k) \neq NH(S_j)$ | $\forall k \neq j$ | with the constraint (c) eliminating a possibility of simultaneous transmission-reception by a node, and the constrain (d) eliminating multiple simultaneous transmission to a single, common receiver in any generated schedule, and where $S_j$ is a source node j; $NH(S_j)$ is a next-hop of source node $S_j$ as determined by the routing decision;

SL={SL$_1$, SL$_2$, ..., SL$_K$} is a vector of slot indexes assigned to various links; SL$_k$ is slot assigned to link K; and SL$_j$ is slot assigned to link j.

A further aspect of the invention provides a method for interference-resilient joint MAC, routing, and power scheme wherein the act of optimizing is further subject to power control decision constraints,

| | |
|---|---|
| (e) SINR$_k$ ≧ γ | ∀ S$_k$ |
| (f) 0 ≦ P$_{tk}$ ≦ P$_{max}$ | ∀ S$_k$ | with the constraint (e) conditioning for successful reception, and the constraint (f) representing a peak power constraint per node, and where SINR$_k$ is a signal-to-interference-and-noise ratio at a receiver of S$_k$, of NH(S$_k$); γ is a minimum requirement on the SINR dictated by an upper bound on a bit error rate necessary for successful reception; P$_{tk}$ is power transmitted by source node K; and P$_{max}$ is maximum power that could be transmitted by a node.

Still a further aspect provides a method for interference-resilient joint MAC, routing, and power scheme wherein the conditioning for successful reception is construed as a power admissibility condition.

Another aspect of the present invention provides a method for interference-resilient joint MAC, routing, and power scheme wherein $$\max_{NH, SL, P_t} \eta_{mac}$$

is determined by constructing interference coupled transmitter sets (ICTs) to explicitly account for interference among transmitters that are within a number of hops distant from a node; resolving intra-set interference within ICT sets; and resolving inter-set interference among different ICT sets.

A further aspect provides a method for interference-resilient joint MAC, routing, and power scheme wherein the act of constructing of ICT sets is on a frame-by-frame basis, with each frame constituting a unit of exchange for the data link layer.

Still a further aspect provides a method for interference-resilient joint MAC, routing, and power scheme wherein the act of constructing of the ICT sets comprises: identifying the number of nodes of the ad-hoc communication network; determining if a node has a packet to transmit in a current frame; and if it is determined that the node has a packet to transmit, informing nodes within a pre-determined distance of a required transmission, through limited H hop flooding, that the node has a packet to transmit, with H represents a number of nodes distant from the node that has a packet to transmit; and, if it is determined that the node has no packet to transmit in the current frame, a next node is identified to determine if the next node has a packet to transmit.

Another aspect of the present invention provides a method for interference-resilient joint MAC, routing, and power scheme wherein the act of resolving intra-set interference comprises: (I) selecting an initial routing decisions that meet constraints (a) and (b); (II) selecting a scheduling decisions; (III) determining if constraints (c) and (d) are met; (IV) if it is determined that constraints (c) and (d) are not met, deferring conflicting transmissions to next slots; if it is determined that the constraints (c) and (d) are met, executing a Distribution Power Control (DPC) process for each slot in the current frame, and determining if all slots are power admissible; if it is determined that all slots are power admissible, selecting a next frame for assignment of routing, scheduling, and power for the next frame; if it is determined that the power admissibility condition is not satisfied, determining if all routing decisions are examined for the same scheduling decision; if it is determined that all routing decisions are not examined for the same scheduling decision, selecting another routing decision for the same schedule, in increasing order of path length, subject to the constraints (a) and (b), and performing acts (III) to (IV); if it is determined that all routing decisions are examined for the same scheduling decision, selecting another scheduling decision by deferring a transmission within minimum Single-Interference-Noise-Ratio (SINR) in violating slots, and selecting a new routing decision for a newly selected schedule, and performing acts (III) to (VI).

Yet another aspect of the present invention provides a method for interference-resilient joint MAC, routing, and power scheme wherein resolving inter-set interference comprises: executing routing, scheduling, and power control solution for overlapping ICT sets at different times and executing non-overlapping ICT sets simultaneously.

Still another aspect of the present invention provides a method for interference-resilient joint MAC, routing, and power scheme wherein resolving inter-set interference further comprises: scanning all nodes within the network; if it is determined that a scanned node is not transmitting, selecting a next node within the network; determining if a scanned, transmitting node has a solution for routing, scheduling, and power control for the respective network, data link, and physical layers; if it is determined that the solution exists, using that solution as a constraint and selecting a next node within the network; if it is determined that the solution does not exist, then determining if the scanned, and transmitting node is a leader of the ICT set; If it is determined that the scanned, transmitting node with no solution is not a set leader, selecting a next node within the network; if it is determined that the scanned, transmitting node has a solution and is a set leader, executing a routing, scheduling, and power control solution for nodes within the leader's set, with the exclusion of nodes that already have a solution, and selecting a next node within the network.

A further aspect of the present invention provides a method for interference-resilient joint MAC, routing, and power scheme for a wireless ad-hoc communication network, comprising the acts of: providing a cross-layer framework that includes a joint routing, scheduling, and power control of respective network layer, data link layer, and physical layer of the communication network that considers interference to optimize Medium Access Control (MAC) throughput $$\max_{NH, SL, P_t} \eta_{mac}$$

by: constructing interference coupled transmitter sets (ICTs) to explicitly account for interference among transmitters that are within a number of hops distant from a node; resolving intra-set interference within ICT sets; and resolving inter-set interference among different ICT sets; where η$_{mac}$ is the MAC throughput; NH constitutes a routing decision, which determines a best hop for transmission of a signal from each source node on the signal's route to a final destination node; SL constitutes a scheduling decision, which determines a slot assigned for establishing a link between each source node and the source node's respective next-hop; and P$_t$ constitutes a power control decision, which determines a transmission power used by the source node to guarantee successful reception at the next-hop.

Still a further aspect provides a method for interference-resilient joint MAC, routing, and power scheme for a wireless ad-hoc communication network wherein the act of constructing interference coupled transmitter sets (ICTs) comprises: identifying the number of nodes of the ad-hoc communication network on a frame-by-frame basis, with each frame constituting a unit of exchange for the data link layer; determining if a node has a packet to transmit in a current frame; and if it is determined that the node has a packet to transmit, informing nodes within a pre-determined distance of a required transmission, through limited H hop flooding, that the node has a packet to transmit, with H represents a number of nodes distant from the node that has a packet to transmit; and if it is determined that the node has no packet to transmit in the current frame, a next node is identified to determine if the next node has a packet to transmit.

Yet another aspect of the present invention provides a method for interference-resilient joint MAC, routing, and power scheme for a wireless ad-hoc communication network wherein the act of resolving intra-set interference within ICT sets, comprises: (I) selecting an initial routing decision, which is constrained to include only loop-free paths, and further having constraints

| | |
|---|---|
| (a) $NH(S_k) \in N(S_k)$ | $\forall\, S_k$ |
| (b) $L \leq \beta$ | $\forall\, S_k$ | with the constraint (a) indicating that a next-hop transmission of any source node should be among the source node's neighbors, and constraint (b) limiting a routing decision space to include only source-destination paths of length no greater than a threshold $\beta$; (II) selecting a scheduling decisions with constraints

| | |
|---|---|
| (c) $SL_k = SL_j \Rightarrow NH(S_k) \neq S_j$ and $NH(S_j) \neq S_k$ | $\forall\, k,j$ |
| (d) $SL_k = SL_j \Rightarrow NH(S_k) \neq NH(S_j)$ | $\forall\, k \neq j$ | with the constraint (c) eliminating a possibility of simultaneous transmission-reception by a node, and the constrain (d) eliminating multiple simultaneous transmission to a single, common receiver in any generated schedule;

(III) determining if constraints (c) and (d) are met;

(IV) if it is determined that constraints (c) and (d) are not met, deferring conflicting transmissions to next slots; if it is determined that the constraints (c) and (d) are met, performing a Distribution Power Control (DPC) process for each slot in the current frame, and determining if all slots are power admissible by ascertaining if power control decision constraints

| | |
|---|---|
| (e) $SINR_k \geq \gamma$ | $\forall\, S_k$ |
| (f) $0 \leq P_{tk} \leq P_{max}$ | $\forall\, S_k$ | are met, with the constraint (e) representing conditioning for successful reception, and the constraint (f) representing a peak power constraint per node; if it is determined that all slots are power admissible, selecting a next frame for assignment of routing, scheduling, and power for the next frame; if it is determined that the power admissibility condition is not satisfied, determining if all routing decisions are examined for the same scheduling decision; if it is determined that all routing decisions are not examined for the same scheduling decision, selecting another routing decision for the same schedule, in increasing order of path length, subject to the constraints (a) and (b), and performing acts (III) to (IV); if it is determined that all routing decisions are examined for the same scheduling decision, selecting another scheduling decision, subject to constraints (c) and (d), by deferring a transmission within minimum Single-Interference-Noise-Ratio (SINR) in violating slots, and selecting a new routing decision, subject to the constraints (a) and (b), for a newly selected schedule, and performing acts (III) to (IV); and where $S_K$ is a source node K $NH(S_K) = \{NH(S_1), NH(S_2), \ldots, NH(S_K)\}$ is a vector of next-hop nodes for all source nodes; L is a length of a path from $S_k$ to $D_k$ passing through $NH(S_k)$ measured in number of hops and averaged over all source-destination pairs; $\beta$ is an upper bound on an average path length; $N(S_k)$ is a set of single-hop neighborhood node K; $S_j$ is a source node j;

$NH(S_j)$ is a next-hop of source node $S_j$ as determined by the routing decision;

$SL = \{SL_1, SL_2, \ldots, SL_K\}$ is a vector of slot indexes assigned to various links; $SL_k$ is slot assigned to link K; $SL_j$ is slot assigned to link j; $SINR_k$ is a signal-to-interference-and-noise ratio at a receiver of $S_k$, of $NH(S_k)$; $\gamma$ is a minimum requirement on the SINR dictated by an upper bound on a bit error rate necessary for successful reception; $P_{tk}$ is power transmitted by source node K; and $P_{max}$ is maximum power that could be transmitted by a node.

Another aspect of the present invention provides a method for interference-resilient joint MAC, routing, and power scheme for a wireless ad-hoc communication network wherein the act of resolving inter-set interference comprises: performing routing, scheduling, and power control solution for overlapping ICT sets at different times and executing non-overlapping ICT sets simultaneously, where the performing act of routing, scheduling, and power control solution for overlapping ICT sets comprises: scanning all nodes within the network; if it is determined that a scanned node is not transmitting, selecting a next node within the network; determining if a scanned, transmitting node has a solution for routing, scheduling, and power control for the respective network, data link, and physical layers; if it is determined that the solution exists, using that solution as a constraint and selecting a next node within the network; if it is determined that the solution does not exist, then determining if the scanned, and transmitting node is a leader of the ICT set; If it is determined that the scanned, transmitting node with no solution is not a set leader, selecting a next node within the network; if it is determined that the scanned, transmitting node has a solution and is a set leader, executing a routing, scheduling, and power control solution for nodes within the leader's set, with the exclusion of nodes that already have a solution, and selecting a next node within the network.

These and other features, aspects, and advantages of the invention will be apparent to those skilled in the art from the following detailed description of preferred non-limiting exemplary embodiments, taken together with the drawings and the claims that follow.

BRIEF DESCRIPTION OF THE DRAWINGS

It is to be understood that the drawings are to be used for the purposes of exemplary illustration only and not as a definition of the limits of the invention.

Referring to the drawings in which like reference numbers or characters present corresponding parts throughout, where.

DETAILED DESCRIPTION OF THE INVENTION (1) Introduction

Figure 1:
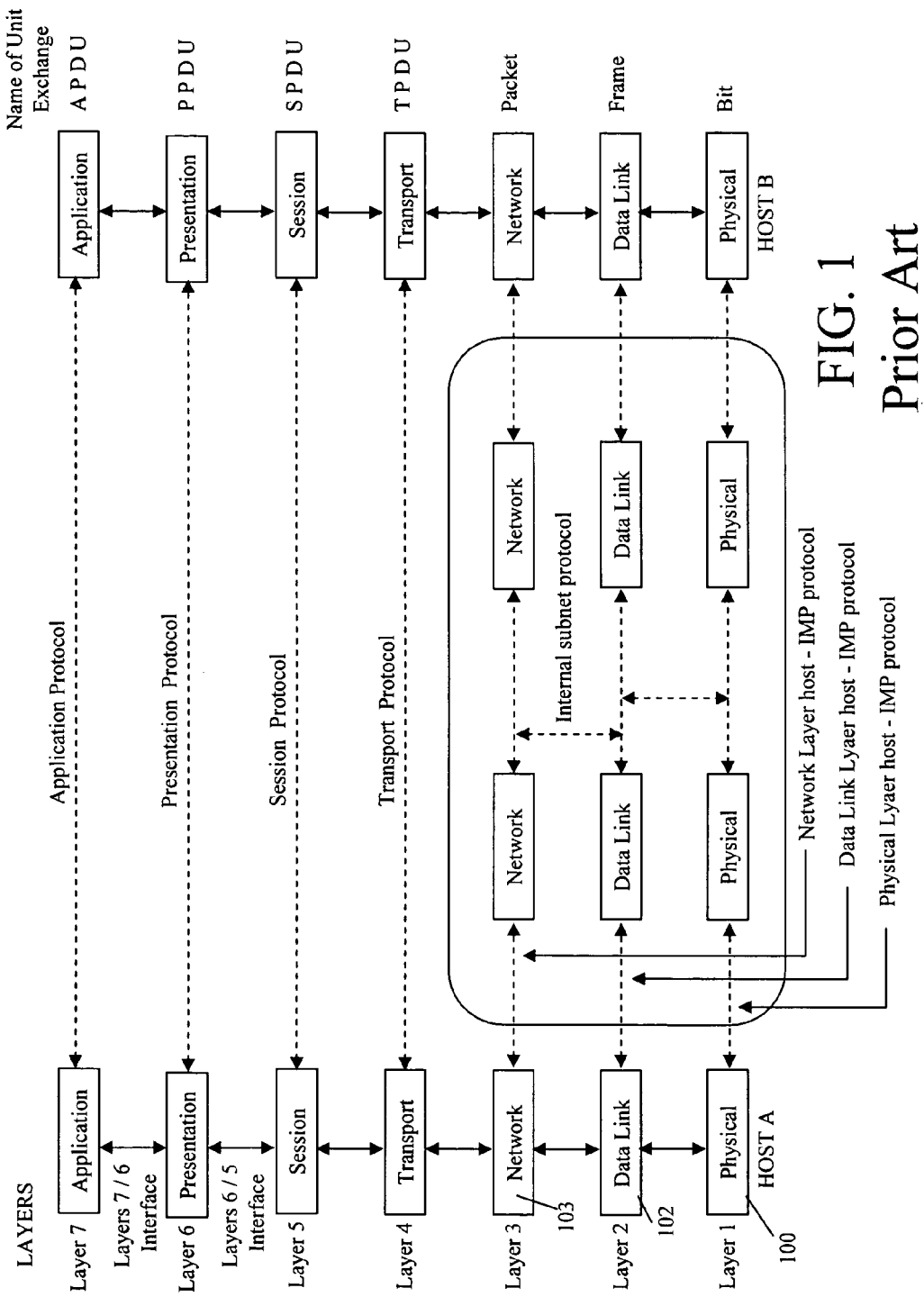
FIG. 1 is an exemplary prior art drawing of network architecture based on the OSI model.
Figure 2:
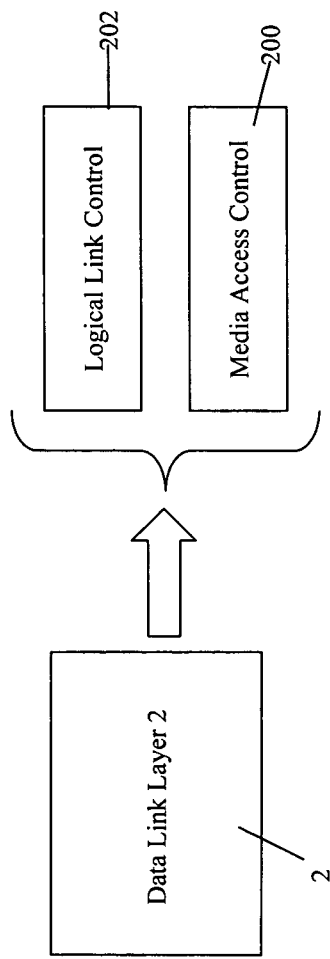
FIG. 2 is an exemplary prior art drawing of the data link sub-layers.
Figure 3:
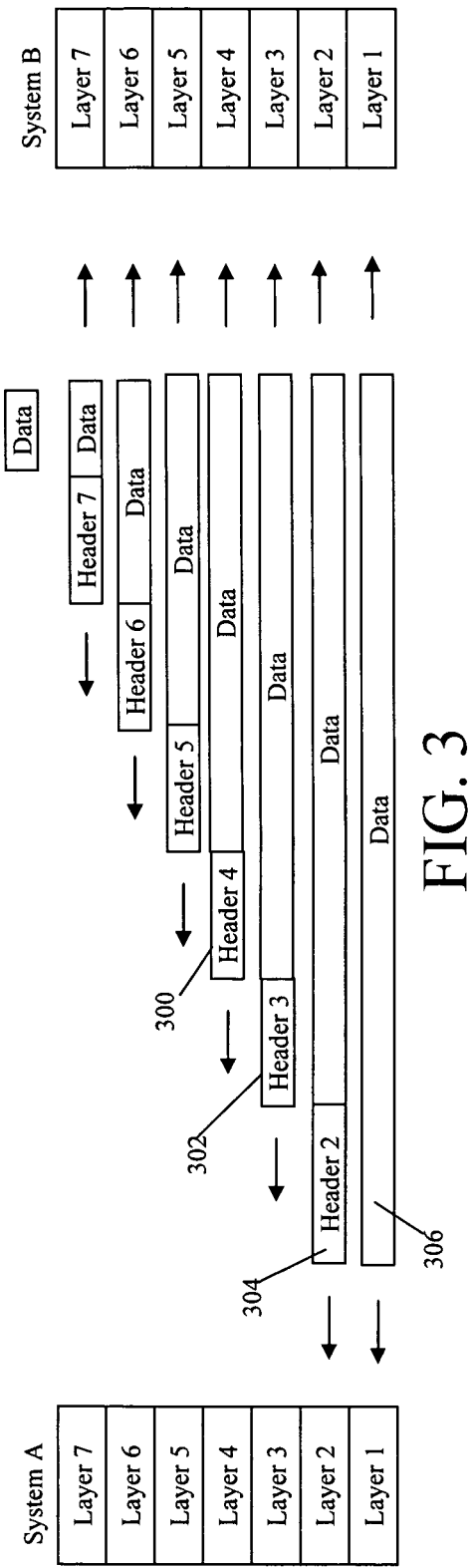
FIG. 3 is an exemplary prior art drawing of data transmission from one host to another based on the OSI model.
Figure 4A:
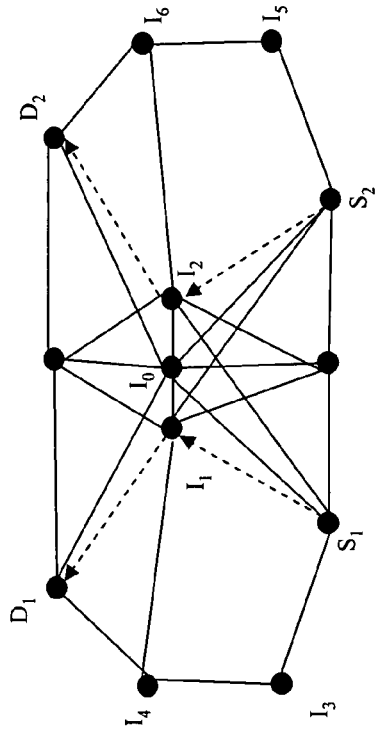
FIGS. 4(a) to (c) are exemplary illustrations of the MAC throughput-path length trade-off in accordance with the present invention.
Figure 4B:
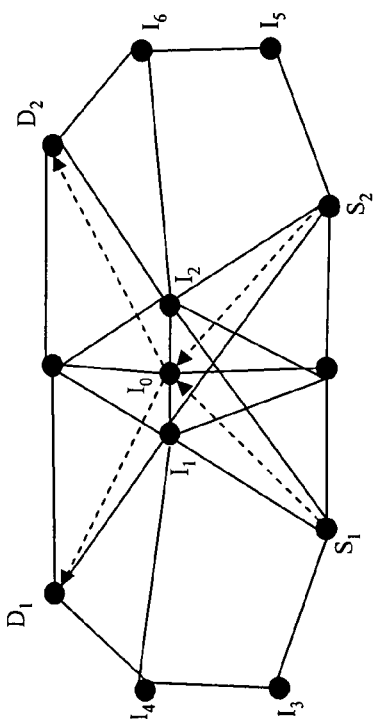
Figure 4C:
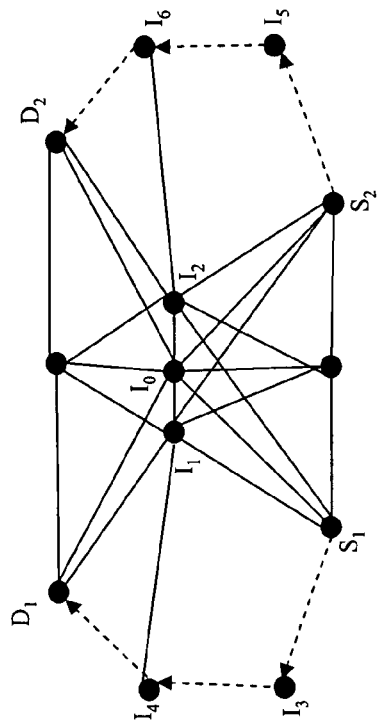

In today's wireless ad-hoc network communications, nodes communicate with one another using the OSI protocols, the layers of which are designed in isolation from one another. Handling routing and multiple access decisions independently could lead to performance degradation in wireless ad-hoc networks. A routing decision utilizing network layer information only could lead to degrading the performance of the multiple access protocol, which eventually leads to degrading the end-to-end throughput. Consider a wireless ad-hoc network consisting of thirteen stationary nodes with connectivity as shown in FIGS. 4(a) to 4(c). For this example, it is assumed that time is slotted and that the channels are constant over a time slot. Moreover, it is assumed that two source-destination pairs S-D of $(S_1, D_1)$ and $(S_2, D_2)$ have identical traffic demands. In addition, it is also assumed that there is always a packet in the queue of each source node S ready for transmission. The routing problem addresses the issue of identifying the neighbor handed a packet for further forwarding to the destination. The link-scheduling problem determines the specific link assigned to a specific slot. FIGS. 4(a), (b), and (c) illustrate and compare the average slot throughput and end-to-end throughput of three routing policies. One may define the slot throughput as the average number of successful transmissions per slot and the end-to-end throughput as the average number of packets that successfully transfer from each source to its respective destination over the period of d slots.

Consider the minimum hop (MH) routing policy illustrated in FIG. 4(a), which is a special case of SP routing when all links have unit metrics. From the network topology, the length of the MH route for each source-destination pair S-D is two hops and there are two MH routes for each S-D pair. Consider the policy where the two source nodes $S_1$ and $S_2$ select node $I_0$ as their next-hop. It is evident that $I_0$ constitutes an interference bottleneck at the MAC layer 2. This is a direct consequence of computing the routes for each S-D pair independently. It completely ignores the interaction among the chosen paths caused by interference from other nodes. The present invention refers to this as interference-induced congestion, which constitutes a fundamental challenge unique to wireless networks. Thus, the two source nodes $S_1$ and $S_2$ can not simultaneously transmit to $I_0$ in the same slot and neither of them can transmit while $I_0$ transmits. Moreover, $I_0$ can forward only one packet to the destination at a time. This, in turn, yields average slot throughput of one transmission per slot. Moreover, this policy consumes four slots for a single packet transfer from each source to its respective destination (referred to as the "Transmission Cycle"). Hence, one could conclude that the above routing policy could transfer d/4 packets, from each source to its destination, over the course of d slots.

FIG. 4(b) illustrates another MH routing policy where node $S_1$ selects node $I_1$ as its next-hop and $S_2$ chooses node $I_2$. In this case, it is assumed that nodes $I_1$ and $I_2$ are spatially close enough to i) prevent simultaneous reception from the source nodes $S_1$ and $S_2$, and ii) prevent $I_1$ from receiving while $I_2$ transmits and vice-versa. In addition, it is assumed that nodes $D_1$ and $D_2$ are spatially far enough to allow simultaneous reception of their packets from nodes $I_1$ and $I_2$ respectively. Intuitively, this routing policy should yield better performance due to selecting two different next-hops for the source nodes $S_1$ and $S_2$. However, the next-hops are very close which still restricts spatial reuse. In this case, the transmission cycle becomes three slots, since the routing policy consumes three slots for a single packet transfer from each source to its destination. Thus, the average slot throughput equals about 4/3 transmissions per slot and the end-to-end throughput equals d/3.

FIG. 4(c) illustrates a routing policy that uses paths longer than MH and that are also sufficiently spatial to avoid the interference bottleneck. It is assumed that $S_1$ follows the three-hop path through $I_3$ and $I_4$, whereas $S_2$ follows the three-hop path through $I_5$ and $I_6$. In this case, successful transmissions on the two paths may take place simultaneously due to sufficient separation between the two paths, and hence, their mutual interference impact is sufficiently tolerable to keep the SINR above the threshold necessary for successful reception. Moreover, the first and third hop transmissions on the same path may be carried simultaneously, whereas the second hop transmission cannot share the same slot with any other transmission on the same path. Under this policy, a simple scheduling scheme would pack same hop transmissions over the two paths in the same slot. This, in turn, would yield an average slot throughput of three transmissions per slot and the transmission cycle would be two slots due to the possible slot reuse between the first and third hop of the same path. Moreover, the end-to-end throughput under the described scheme would be d/2. By not allowing slot reuse along the same path, the transmission cycle equals three slots and the average slot throughput becomes two transmissions per slot. Finally, the end-to-end throughput equals d/3.

It should be clear from the above description that the trade-off between the MAC throughput and path length has a direct impact on the end-to-end throughput. The first policy (FIG. 4(a)) attempts to minimize the path length while completely ignoring the MAC throughput. The third policy (FIG. 4(c)) represents an attempt to balance the aforementioned trade-off by improving the MAC throughput at the expense of a slight increase in the path length. Therefore, the present invention provides potential avenues for jointly designing the MAC and routing algorithms.

Before providing details regarding the various methods of the present invention, first a glossary of terms is provided as a reference for the reader. Next, a system overview is provided, describing the interconnection and operation of various major components of a system in accordance with the present invention. After the system overview, a data processing system overview is presented to acquaint the reader with the various components typically found in a data processing system that may be used in conjunction with the present invention. Next, a discussion section is provided in which the various major components presented in the system overview are discussed in detail. Finally, a results section is provided, which presents non-limiting examples of the operation of the present invention in order to provide a more tangible understanding of the operation of the invention.

(2) Glossary

In order to provide a working frame of reference, a glossary of some of the terms used in the description and claims is given as a central resource for the reader. The glossary is intended to provide the reader with a general understanding of various terms as they are used in this disclosure and is not intended to limit the scope of these terms. Rather, the scope of the terms is intended to be construed with reference to this disclosure as a whole and with respect to the claims below. Further, the definitions provided should not be considered limiting to the extent that the terms are known in the art. These definitions are provided to assist in the understanding of the present invention.

Ad-Hoc Routing Protocol(s)—Ad-hoc Routing Protocol describes an information routed through an unorganized wireless network.

Carrier Sense Multiple Access (CSMA)—CSMA is a protocol in which nodes listen for a carrier (i.e. transmission) and act accordingly.

Carrier Sense Multiple Access with Collision Avoidance (CSMA/CA)—With CSMA/CA, if two nodes sense the channel to be idle and begin transmitting simultaneously, they will both detect collision almost immediately. Rather than finish transmitting their information (frames), they abruptly stop transmitting thus avoiding collision and saving time and bandwidth.

Contention-Based MAC Scheme—Contention-based MAC scheme is a MAC scheme in which multiple nodes share a common channel in a way that can lead to conflicts.

End-to-End Network Throughput—End-to-end network throughput is the number of bits per second that can be transmitted from a source to a destination.

Frame—A frame is a unit of data for the OSI data-link layer 2, measured in time comprised of time slots.

Frequency-Hoping Spread-Spectrum Ad-hoc Network—Frequency-Hoping Spread-Spectrum Ad-hoc Network is a well-known technique, allowing nodes to have a specified sequence of information transmission/reception between specific frequencies over time to minimize interference.

Hop—A hop is a path between two nodes, along which information is transmitted.

Link-Based Routing—Link-based routing is a decision for routing information through various communication nodes based on their link criteria.

Medium Access Control (MAC) Routing Algorithm—MAC routing algorithm is a method that combines the functionality of the MAC and the routing layers.

Minimum Hop Routing (MHR)—MHR is a routing decision based on the minimum number of hops between source and destination.

Multi-User Interface—Multi-user interface is interference caused by multiple nodes.

Node—A node is a transceiver communication and/or computing unit.

Open Systems Interconnection (OSI) Protocol Stack—The OSI stack is a well-known standard description or "reference model" for how messages should be transmitted between any two points in a communication system. The OSI stack is comprised of seven main layers.

Packet(s)—A packet is a unit of data for the OSI network layer 3.

Reservation-Based MAC Scheme—Reservation-based MAC schemes are Medium Access Control schemes in which multiple nodes reserve a time in a controlled sub frame initially to try to avoid collision.

Set-Based Routing—Set-based routing is routing of information based on a set of nodes.

Single-Hop Links—A single hop link is used in reference to the number of bits per second or packets that successfully transmit over a single hop from a transmitter to a receiver.

Unicast Packet(s)—Unicast packet is a packet generated at a source node for a single destination node.

(3) System Overview

The present invention formulates an optimization problem that balances the interaction between and trade-off with (or across) higher and lower layers of the wireless OSI network communication. More specifically, the optimization problem of the present invention addresses the role of multi-user interference within the environment of the cross-layer framework for multiple access and routing design in wireless ad-hoc networks. The optimization problem of the present invention incorporates the OSI layer 3 routing protocols, the OSI layer 2 linking protocols, and the OSI layer 1 physical layer protocols to achieve a maximum MAC throughput measured in the average number of successful transmissions per slot. The routing protocols are addressed as the best Next-hop (NH) of a transmission from each source on its route to the final destination. The linking protocols are addressed as the slot (SL) assignment for establishing the link between each source and its respective Next-hop (NH). The final physical layer (the power transmission protocol) are addressed as the transmission power used by the source nodes to guarantee successful reception at the next-hop. The combination of these protocols provides for a maximum (max) throughput for the MAC layer ($\eta$) measured in the average number of successful transmissions per slot.

$$\max \eta_{mac}$$
$$NH, SL, P_t \quad (1)$$

The optimization problem for a maximum MAC throughput is complex due to a joint problem that accommodates three different sub-problems, namely routing (NH), scheduling (SL), and power control ($P_t$), where the routing and scheduling problems are combinatorial in nature. The present invention proposes a simple heuristic that highlights the strengths of the cross-layer design approach, and at the same time maintains algorithm simplicity and scalability. A fundamental part of this approach is to define an interference-aware routing metric based on the novel concept of routing a set of links concurrently rather than routing each link independently. That is, the present invention constructs Interference Coupled Transmitter (ICT) sets from individual nodes, resolves "intra-set" interference, and resolve "inter-set" interference to provide the maximum MAC throughput.

(4) Data Processing System Overview

Figure 6:
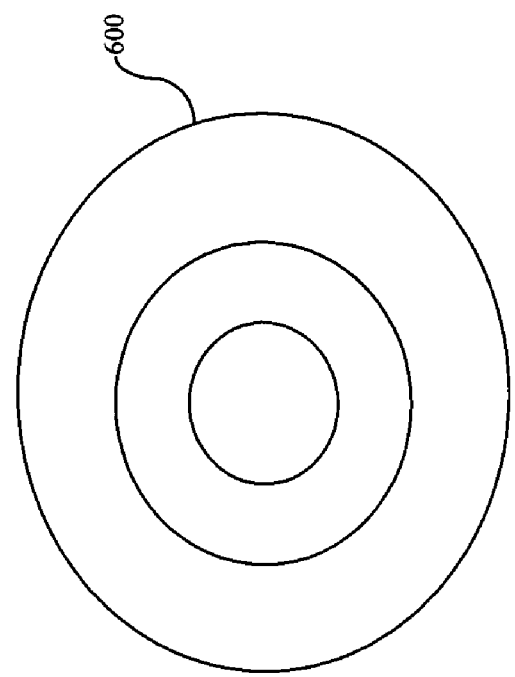
FIG. 6 is an exemplary illustration of a data storage unit (medium) in accordance with the present invention.
Figure 5:
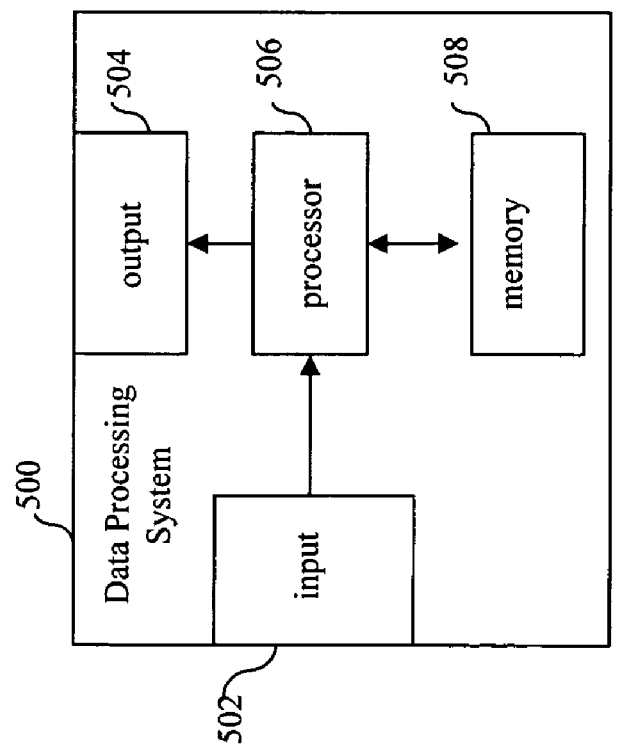
FIG. 5 is an exemplary illustration of a data processing system in accordance with the present invention.

A block diagram depicting the components of a computer system that may be used within the nodes of the ad-hoc wireless communication network in the present invention is provided in FIG. 5. The data processing system 500 comprises an input 502 for input signals from any inputting mechanism, non-limiting examples of which include an external computer connected to the system, an internet connection, or any computer readable medium 600 (illustrated in FIG. 6) such as a floppy disk, Compact Disk (CD), a Digital Versatile Disk/Digital Video Disk (DVD), and a removable hard drive. The input 502 may also be configured for receiving user input from another input device such as keyboard, a mouse, or any other input device best suited for use with this invention. Note that the input 502 may include multiple "ports" for receiving data and user input, and may also be configured to receive information from remote databases using wired or wireless connections. The output 504 is connected with the processor 506 for providing output to the user, possibly through a video display. Output 504 may also be provided to other devices or other programs, e.g. to other software modules, for use therein, possibly serving as a wired or wireless gateway to external databases or other processing devices. The input 502 and the output 504 are both coupled with a processor 506, which may be a general-purpose computer processor or a specialized processor designed specifically for use with the present invention. The processor 506 is coupled with a memory 508 to permit storage of data and software to be manipulated by commands to the processor.

(5) Discussion

Figure 7:
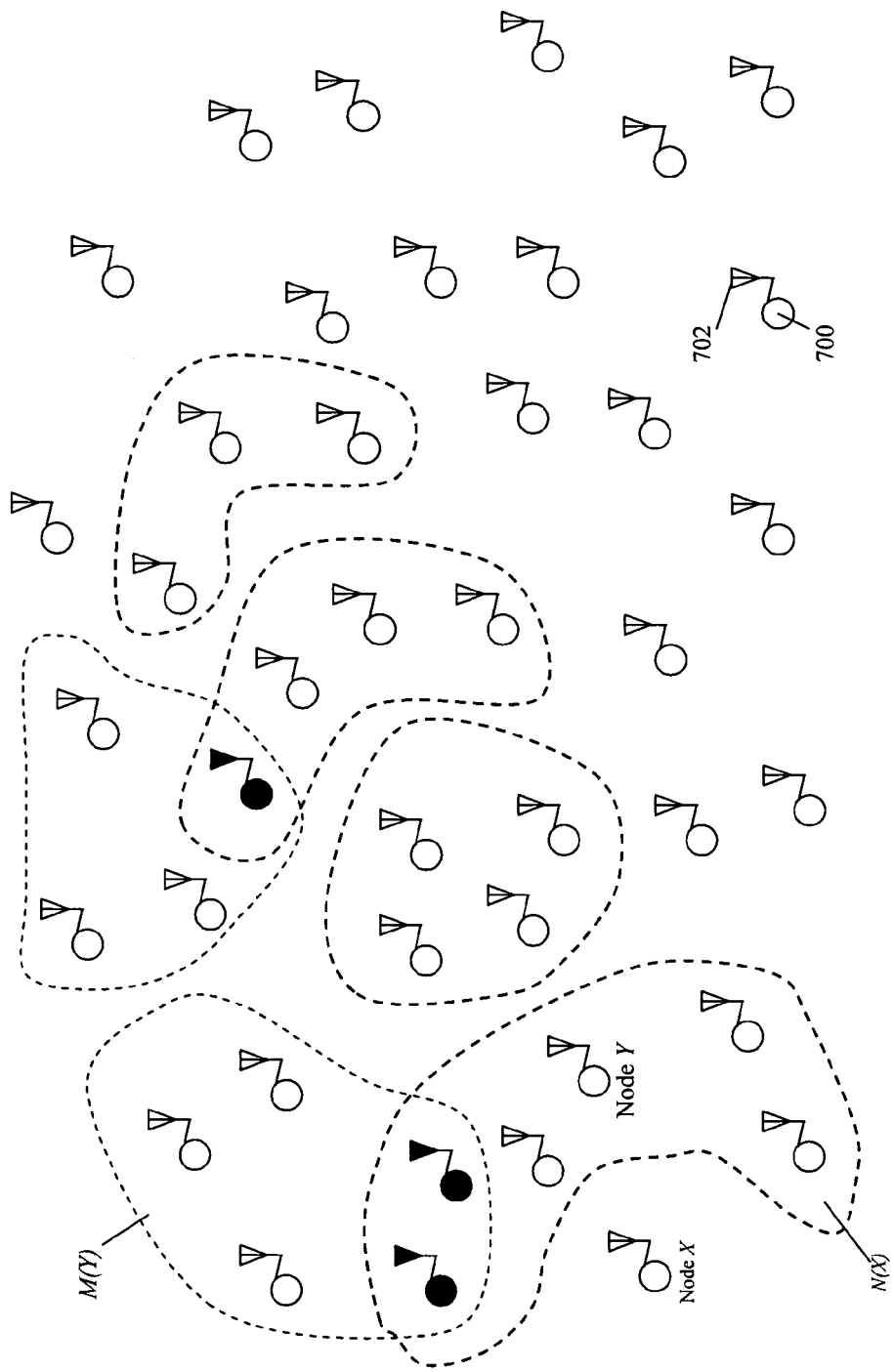
FIG. 7 is an exemplary illustration of a plurality of nodes within a wireless ad-hoc network in accordance with the present invention.

FIG. 7 is an exemplary illustration of a wireless ad-hoc network consisting of n nodes 700, which communicate via a wireless medium. Nodes 700 have unique identifications (IDs) indexed from 1 to n. Each node 700 is supported by an omni-directional antenna 702 that radiates energy approximate to an isotropic pattern. It is assumed that each node 700 is cognizant of the geographical location of all other nodes by well-known location discovery schemes. All nodes 700 share the same frequency band, and time is divided into equal size slots that group into frames. Each frame is of fixed length and divided into a control sub-frame and a data sub-frame, with the latter comprising of d data slots. In general, the frame length chosen, heuristically, depends on the number of nodes, network load, and quality-of-service constraints. In general, the slot duration is longer than packet duration by an interval called the "guard band." These bands are essential to compensate for arbitrary delays incurred by transmitted packets due to signal propagation delays and/or clock drifts.

As illustrated in FIG. 7, for an arbitrary node x, it is assumed that node y is a neighbor of node x if node y successfully receives its transmission under two conditions: i) node x uses a pre-specified power level (e.g. maximum power) and ii) node x is the only node transmitting, i.e. there is no multi-user interference. In this case, successful reception is guaranteed if the signal-to-noise ratio (SNR) at node y is greater than a threshold which simply translates to a minimum requirement on the received power level. In the context of the present invention, this topology is referred to as the "basic topology" since successful communications over some links may be impossible in the presence of interference. However, it serves the purpose of defining the set of neighbors of node x, denoted N(x), which is instrumental in specifying the routing policy space. The proposed cross-layer framework builds on top of table-based (pro-active) routing protocols, non-limiting examples of which include, the well-known distributed Bellman-Ford algorithm. Thus, route information is available to all nodes 700 in the network.

Since the trade-off at hand prevails even in case of no mobility, users' mobility is not considered. In addition, this trade-off could persist in case of mobility of a node. However, this assumption relaxes with the case of low mobility where the link gain matrix changes over a time scale much larger than the time scale over which the proposed algorithm operates, namely a frame. Accordingly, the link gain matrix is assumed constant over the course of a frame. A source node generates information packets of fixed length according to well-known distribution processes, including, as a non-limiting example, a Poisson distribution arrival process with rate $\lambda$ packets/sec. The present invention assumes a uni-cast traffic for the system, that is, each packet is intended for a single destination only. In addition, it is also assumed that the transmission power $P_r(z)$ decays non-linearly according to the formula $P_r(z)=P_t*z^{-\alpha}$, where $P_t$ is the transmitted power, z is the distance between the transmitter and the receiver and $\alpha$ is a parameter whose value may range approximately from 2 to 4. Another assumption made is that each node 700 can use no more than a maximum power level, denoted $P_{max}$, for transmission. The limited weight and size of the wireless terminals enforce this. Furthermore, the present invention assumes the existence of a separate feedback channel that enables a receiver to send its Signal-to-Interference-Noise-Ratio (SINR) measurements to their respective transmitters in a contention-free manner. This assumption is reasonable since feedback messages (e.g. Acknowledgements (ACKs)) are typically small, compared to data packets, and therefore sending them in a contention-free manner does not cause significant waste of network resources.

Most of the multi-user interference models introduced in the literature (including IEEE 802.11x) assume that the transmission range of any node is limited (typically circular) and beyond that range, no interference is caused. However, this model ignores the fact that a very large number of distant interferences (e.g., nodes) might cause negligible amounts of interference individually, but their aggregate effect could disrupt a successful reception. On the other hand, an alternative model for TDMA-based schemes for a joint scheduling and power control approach to the MAC problem has been proposed by ElBatt et al. (one of the inventors of the present invention) in a publication titled "Joint Scheduling and Power Control for Wireless Ad-hoc Networks," Proc. IEEE Infocom, June 2002, the entire disclosure of which is incorporated herein by reference, in which it is assumed that any transmitter in the network causes interference at any receiver, regardless of the distance between the transmitter and the receiver nodes. However, this implies that any wireless network model is a "fully-connected" or a mesh network. This is not a useful model due to the following reasons: i) the signal strength is severely attenuated as the signal travels away from the transmitter as indicated earlier, and ii) considering interference coupling throughout the entire network turns out to be computationally complex and requires a centralized controller. Therefore, the present invention adopts a model that explicitly accounts for interference among transmitters that are within certain number of hops away from a given node. That is, the present invention introduces the notion of "set-based" routing where interference among spatially close links ("intra-set" interference) is considered explicitly. Furthermore, interference among spatially distant links is considered implicitly though the notion of "inter-set" interference.

Based on the trade-off between MAC (or single-hop) throughput and path length, the present invention formulates an optimization problem that balances this trade-off. Thus, given a set of K source-destination pairs (i.e., flows) at the beginning of frame i, denoted $SD(i)=\{(S_1, D_1), (S_2, D_2), \ldots, (S_K, D_K)\}$, the joint-MAC Routing problem can be formulated as a multi-objective optimization problem with the MAC throughput and path length as the objective functions. Among several methods for solving multi-objective optimization problems, the present invention uses the weighted-sum method, applied as follows:

$\max \eta_{sh} - \omega L$ $NH, SL, P_t$ (2)

subject to:

| |
|---|
| $NH(S_k) \in N(S_k)$ |
| $SL_k = SL_j \Rightarrow NH(S_k) \neq S_j$ and $NH(S_j) \neq S_k$ $\quad \forall k,j$ |
| $SL_k = SL_j \Rightarrow NH(S_k) \neq NH(S_j)$ $\quad \forall k \neq j$ |
| $SINR_k \geq \gamma$ $\quad \forall S_k$ |
| $0 \leq P_{tk} \leq P_{max}$ $\quad \forall S_k$ | where, $\eta_{sh}$ is the average single-hop throughput over all slots in the frame, where the single-hop throughput equals the number of successful transmissions per slot;

L is the length of the path from $S_k$ to $D_k$ passing through $NH(S_k)$ measured as a number of hops and averaged over all source-destination pairs;

ω Represents a weighting factor chosen to reflect the desired relative importance of the two components in the cost function;

$NH=\{NH(S_1), NH(S_2), \ldots, NH(S_K)\}$ is the vector of next-hop nodes for all source nodes, and $NH(S_k)$ is the next-hop neighbor of node $S_k$ towards its final destination $D_k$;

$SL=\{SL_1, SL_2, \ldots, SL_K\}$ is the vector of slots assigned to various links, and $SL_k$ is the index of the slot assigned to link k (i.e. the transmission from $S_k$ to $NH(S_k)$);

$P_t=\{P_{t1}, P_{t2}, \ldots, P_{tK}\}$ is the vector of transmission powers by various source nodes, and $P_{tk}$ is the power transmitted by node $S_k$ to reach the next-hop $NH(S_k)$;

$SINR_k$ is the signal-to-interference-and-noise ratio at the receiver of node $S_k$, i.e. $NH(S_k)$;

and γ represents a threshold on the SINR dictated by the upper bound on the Bit Error Rate (BER) necessary for successful reception.

In the above formulation, the optimization is done with respect to the following degrees of freedom: i) the vector of next-hop neighbors (NH), constituting the routing policy, ii) the slot assignment vector (SL), constituting the link scheduling policy, and iii) the transmission power vector that guarantees successful communication over the links ($P_t$), constituting the power control policy. It is worth noting that the choice of the parameter ω is rather unguided since there is no well-defined procedure for choosing it. The present invention employs, instead, an equivalent formulation, which consists of optimizing one component of the composite cost function subject to the other component staying below a pre-determined acceptable threshold. Hence, the selection of weights ω should reflect the relative importance of the two objectives (a trade-off between MAC throughput and path length). Therefore, the present invention adopts the ε-constraint (or trade-off) method due to its simplicity. According to this method, one aim is to select as the primary objective to optimize (MAC throughput in this case) and the other objective (average path length) is reformulated as a constraint. Thus, the problem boils down to solving the following single-objective constrained optimization problem:

$\max \eta_{mac}$ $NH, SL, P_t$ (3)

subject to:

| | |
|---|---|
| (a) $NH(S_k) \in N(S_k)$, | $\forall S_k$ |
| (b) $L \leq \beta$, | $\forall S_k$ |
| (c) $SL_k = SL_j \Rightarrow NH(S_k) \neq S_j$ and $NH(S_j) \neq S_k$, | $\forall k,j$ |
| (d) $SL_k = SL_j \Rightarrow NH(S_k) \neq NH(S_j)$, | $\forall k \neq j$ |
| (e) $SINR_k \geq \gamma$, and | $\forall S_k$ |
| (f) $0 \leq P_{tk} \leq P_{max}$; | $\forall S_k$, | where, $\eta_{mac}$ is the MAC throughput measured in the average number of successful transmissions per slot; K is an integer index from 1 to K; $S_K$ is a source node; $NH(S_K)=\{NH(S_1), NH(S_2), \ldots, NH(S_K)\}$ is the vector of next-hop nodes for all source nodes;

L is the length of the path from $S_k$ to $D_k$ passing through $NH(S_k)$ measured as a number of hops and averaged over all source-destination pairs; β is an upper bound on the average path length that represents its role in the optimization problem. The threshold β is the equivalent parameter and has a one-to-one correspondence to the value of the weight ω;

$SL=\{SL_1, SL_2, \ldots, SL_K\}$ is the vector of slot indices assigned to various links;

$P_t=\{P_{t1}, P_{t2}, \ldots, P_{tK}\}$ is the vector of transmission powers of various source nodes to their respective next-hops;

$SINR_k$ is the signal-to-interference-and-noise ratio at the receiver of $S_k$, i.e., $NH(S_k)$; and γ is a minimum requirement on the SINR dictated by the upper bound on the Bit Error Rate (BER) necessary for successful reception.

Figure 8:
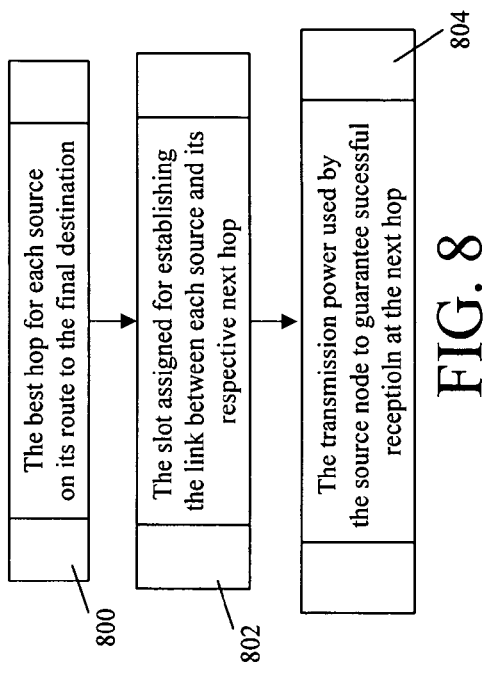
FIG. 8 is an exemplary flow diagram for maximizing the MAC throughput in accordance with the present invention.

As illustrated in FIG. 8, in the above formulation (equation (3)), just as in equation (2), the optimization is done with respect to the best Next-hop (NH), which constitutes the routing policy 800, Slot Assignment (SL), which constitutes the link scheduling policy 802, and the transmission power used $P_t$, which constitutes the power control policy 804. Constraints (a) and (b) of equation (3) are relevant to the routing portion of the problem. The constraint (a) implies that the next-hop of any source should be among its neighbors. The constraint (b) limits the routing policy space to include only source-destination paths of length no greater than the threshold β. This, in turn, relaxes the shortest path requirement adopted in most routing protocols in the prior art literature. Hence, the multi-hop throughput in wireless ad-hoc networks depends on path length and the MAC throughput. In addition, the routing policy space is constrained to include only loop-free paths. Constraints (c) and (d) relate to the scheduling portion of the problem, and simply eliminate the possibility of simultaneous transmission/reception by a node 700 (self-interference) and multiple simultaneous transmissions to the same receiver (common receiver) in any generated schedule. Finally, constraints (e) and (f) relate to the power control portion of the problem. The fifth constraint reflects the condition for successful reception (power admissibility condition) and the last constraint represents the peak power limit per node 700, i.e., the maximum transmission radiated by a wireless terminal.

The complexity of the above problem (equation (3)) is due to a joint problem that accommodates three different sub-problems, namely routing, scheduling, and power control, where the routing and scheduling problems are combinatorial in nature. For instance, the size of the routing policy space R grows exponentially with the number of S-D pairs K. This can be confirmed by observing a set of K source-destination pairs $\{(S_1, D_1), (S_2, D_2), \ldots (S_K, D_K)\}$, where the size of the routing policy is in the order of $$O\left(\prod_{k=1}^{K} |NH(S_k)|\right),$$

where symbol Π represents a multiplicative series. It is worth noting that although the path length constraint in equation (3) above may lead to reducing the number of neighbors who are eligible to be next-hops (i.e., limits the scope of the routing search space), the exponential growth of the routing policy space with the number of flows would still prevail. Furthermore, the scheduling policy space not only grows with the number of flows but also with the number of data slots per frame d. This, in turn, constitutes a major hurdle against finding the optimal joint policy. The difficulty of the problem is further aggravated by the following factors: i) it is not amenable to analytical optimization techniques due to the lack of a tractable mathematical structure, and ii) it is real-time in nature and since it needs to be solved on a frame-by-frame basis. This, in turn, may suggest simulation-based discrete exhaustive search (DES) as the last resort to measure the performance of various joint policies and rank them for deciding optimality. However, the present invention proposes a simple heuristic that highlights the strengths of the cross-layer design approach, and at the same time, maintains algorithm simplicity and scalability. A fundamental part of this approach is to define an interference-aware routing metric based on the novel concept of routing a set of links concurrently rather than routing each link independently.

Therefore, unlike shortest-path (SP) routing, the above formulation of equation (3) shows that the routing decision depends on the MAC throughput and path length. Under SP routing, the path length, which depends on the link metric, is the only factor that decides the chosen route between the members of any S-D pair. Various examples of link metrics in the literature, namely Euclidean distance, residual battery charge, and buffer occupancy, depend solely on the two nodes forming the link. They are independent of the existence of other S-D pairs or their SPs. On the contrary, the above equation (3) incorporates multi-user interference into the routing decision via the MAC throughput objective and the SINR constraint. Unlike the aforementioned link metrics, these two factors depend on the existence of other source nodes and their spatial separation. Hence, the routing decision of a given S-D pair couples with the routing decision of other S-D pairs. Accordingly, the notion of a link metric that incorporates interference (or MAC throughput) becomes impossible since the interference introduced to the receiver of a link depends on the next-hops of other links which, in turn, depends on the interference caused by the link of interest. In other words, the development of such a metric (i.e., a link metric that incorporates interference) is not straightforward since the level of multi-user interference experienced at non-intended receivers depends on which neighbor is chosen as the intended receiver, which in turn, depends on the routing decision.

Figure 9B:
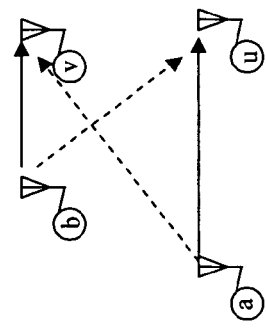
FIGS. 9(a) and 9(b) are exemplary illustrations of multi-user interference based on the routing decisions taken, in accordance with the present invention.
Figure 9A:
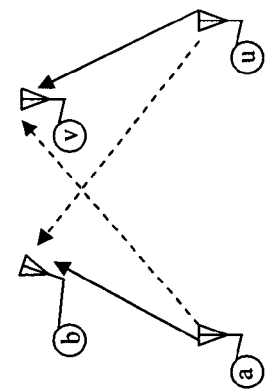

This insight can be illustrated with the aid of the following example. Assume node a is transmitting to next-hop node b and node u is transmitting to next-hop node v as shown in FIG. 9(a). The amount of interference I at node v from transmitters other than node u equals;

$$I_v^u = P_{ab} \frac{1}{d_{av}^\alpha}, \tag{4}$$

where P represents transmission power between nodes a and b and d is distance between nodes a and v. On the other hand, if node a was transmitting to node u and node b was transmitting to node v as shown in FIG. 9(b), then the amount of interference I seen at node v would be different:

$$I_v^b = P_{au} \frac{1}{d_{av}^\alpha}, \tag{5}$$

where P represents transmission power between nodes a and b and d is distance between nodes a and v. Thus, the interference introduced to link u-v depends on the routing decision of node a, which, in turn, depends on the interference caused by the transmitter at node u. Hence, it is evident that the level of interference at non-intended receivers depends on the transmission power and characteristics of the channel to the intended receiver. In the wireless ad-hoc network context, the intended receiver would normally be the "next-hop" on the path to final destination. This, in turn, creates a fundamental challenge in defining a link-based routing metric that considers interference. This is attributed to the fact that interference caused at non-intended receivers, which is needed to define the routing metric, is not known until the next-hop, which is determined by the routing algorithm itself. More specifically, defining the routing metric depends on factors (i.e., interference) that are determined by the routing metric itself. This, in turn, demonstrates that conventional link-based routing metrics, widely used in wired and wireless ad-hoc networks, fail to incorporate the interference coupling between neighboring links.

The approach presented by this invention is to shift the focus from "link-based" routing to the notion of "set-based" routing. This decision is based on the following key observations: i) the routing metric has been classically defined, in wired and wireless networks, for each source-destination pair independently, which in turn, leads to the notion of "link-based" metrics, ii) defining a routing metric for a set of links concurrently would take care of the aforementioned problem since the metric involves determining the transmission powers over multiple links simultaneously, and iii) the proposed set-based routing is in complete agreement with the objective of coupling the routing decision of various source-destination paths due to interference. Thus, in light of the present invention it may be concluded that the notion of set-based routing constitutes a paradigm shift for considering multi-user interference in the routing problem in wireless ad-hoc networks. Hence, equation (3) can be defined for a set of interference-coupled transmitters (ICT).

Figure 10:
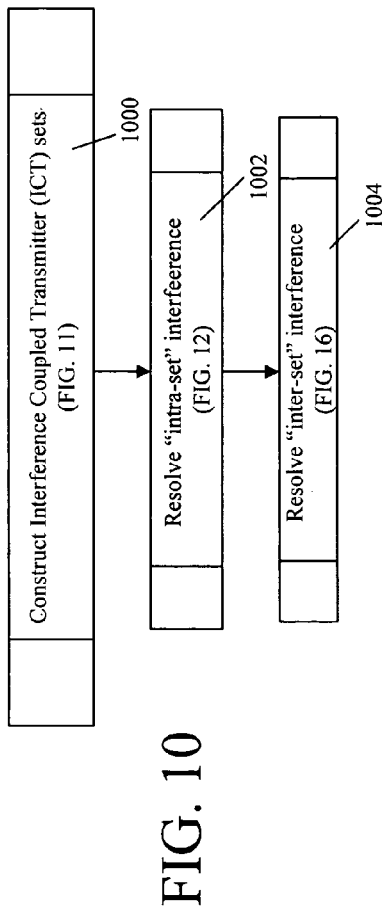
FIG. 10 is an exemplary flow diagram for processes used in maximizing the MAC throughput in accordance with the present invention.

Therefore, given the challenge of incorporating interference into the routing metric along with the sheer complexity of solving the problem over the entire network, the present invention solves the problem for groups of spatially close source nodes (referred to as "sets"). The present invention introduces a novel joint MAC-routing concept that could improve the end-to-end network throughput by routing a group of spatially close links concurrently rather than independently. Accordingly, as illustrated in FIG. 10, the present invention provides an algorithm that constructs interference-coupled transmitters (ICT) sets 1000, resolves intra-set interference by the joint routing, scheduling, and power control algorithm 1002, and resolves potential interference among overlapping sets by set coordination schemes 1004.

The set construction and size are two aspects pertaining to ICT set-based routing. Given that interference is the main factor that led to the notion of set-based routing, this directly implies that an ICT set should accommodate spatially close transmitters that may cause destructive interference at their respective next hops. Thus, within each ICT set (indicated by the dashed lines surrounding a group of nodes, illustrated in FIG. 7), the trade-off between single-hop (MAC) throughput and path length strongly prevails. On the other hand, transmitters that are spatially far from each other would cause a negligible amount of interference along their respective next-hops. Therefore, their routing decisions may be taken independently, unless indirect coupling arises due to set overlapping, as will be discussed later. In other words, the routing decisions of spatially distant transmitters may indirectly couple through the notion of inter-set interference. The present invention adopts topology-based criteria for defining ICT sets such that transmitters that are within H hops from a specific transmitter belong to the same ICT set. Otherwise, they belong to different sets. Therefore, the ICT set construction algorithm illustrated in FIG. 11 groups spatially close transmitters into the same ICT set and, at the same time, groups distant transmitters into different ICT sets.

Figure 11:
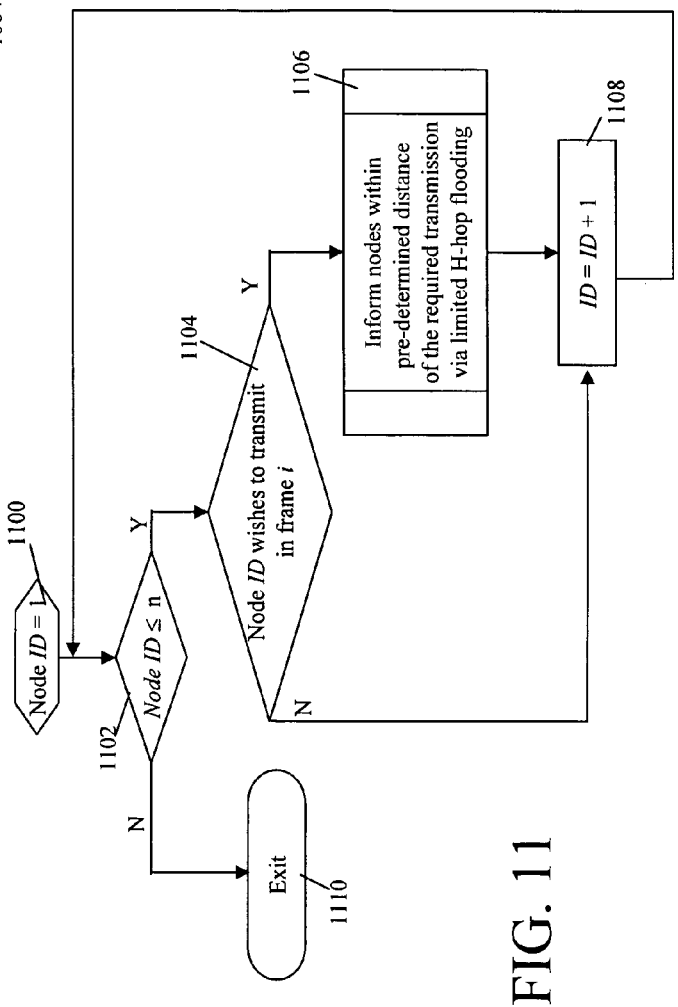
FIG. 11 is an exemplary flow diagram for constructing an Interference Coupled Transmitter (ICT) sets in accordance with the present invention.

FIG. 11 illustrates a simple method for constructing ICT sets on a frame-by-frame basis. The method commences at step 1100 with the minimum ID node, i.e. node 1. If node 1 has a packet to send in the current frame (at step 1104), it sends a control packet including its transmission requirement to its H-hop neighbors by H-hop flooding (at step 1106). Otherwise, no action is required and the algorithm proceeds to node 2 (by step 1108), then goes through the same steps. Accordingly, the method goes through all nodes (the total number indicated by the index n) in a round-robin fashion where it skips nodes that have nothing to transmit, and nodes that wish to transmit inform their H-hop neighbors. By the completion of the algorithm (node ID being greater than n at step 1102), each node 700 in the network (illustrated in FIG. 7) have a list of transmitters up to H-hops away. The nodes that have nothing to transmit in the current frame would just ignore their respective lists; source nodes K with something to transmit consider their H-hop transmitter list as $ICT_k$ set, and become the leaders of their sets. Note that for K S-D pairs, the above method constructs K ICT sets, one per source node. This, in turn, implies considerable overlapping among most of the constructed sets (i.e., transmitters that belong to multiple ICT sets at the same time, as illustrated in FIG. 7). Coordination schemes described below handle set overlapping. This approach is favorable since the set size could be dynamically controlled, depending on interference conditions, by adapting the parameter H. Alternative approaches to grouping transmitters may also be used as done in the article Cruz et al., where transmitters in a pre-specified geographical area are grouped in the same cluster. However, inter-cluster interference was approximated as static ambient noise. Notice that transmissions in the ICT set construction phase are contention-free and are carried over the control sub-frame at the beginning of each frame. The control messages are considerably smaller than data packets, and hence, contention-free transmission should not constitute significant waste of resources.

The number of transmitters in $ICT_k$ (the set size) is denoted $M_k$, and is controlled through the parameter H (the number of hops) to trade-off between complexity and performance. It solely depends on the number of S-D pairs and the spatial separation of source nodes, and hence, it may vary from one set to another. At one extreme, $M_k=1$ $\forall_k$ implies that all source nodes (transmitters) are routed independently, and potential interference coupling between some transmitters is simply ignored. This represents the simple extreme since each S-D pair is routed in isolation using the SP criteria. In other words, routing a data packet of any transmitter is a local decision that is independent of the routing decision at any other transmitter. This causes a performance loss due to interference-induced congestion.

At the other extreme, M=K represents the case where a routing decisions of all source nodes in the network are coupled in a single ICT set. This approach considers concurrent MAC and routing decisions of all transmitters in the network. Although this approach accurately captures the role of interference in the routing problem, it has the following limitations: i) computational complexity due to the combinatorial nature of the routing and scheduling problems as illustrated earlier, ii) this network-wide optimization renders the routing decision a global one that needs a central controller to carry out the network-wide task, and iii) it does not exploit the fact that interference caused by far transmitters can be ignored. The present invention shows different methods for performance improvement using the cross-layer framework without sacrificing simplicity, scalability and localized operation features. Accordingly, the present invention focuses on values of $M_K$ that are greater than one, yet at the same time much smaller than the network size K. Therefore, one could set H=2, which yields $M_k$ values that are greater than one, yet much smaller than K.

Figure 12:
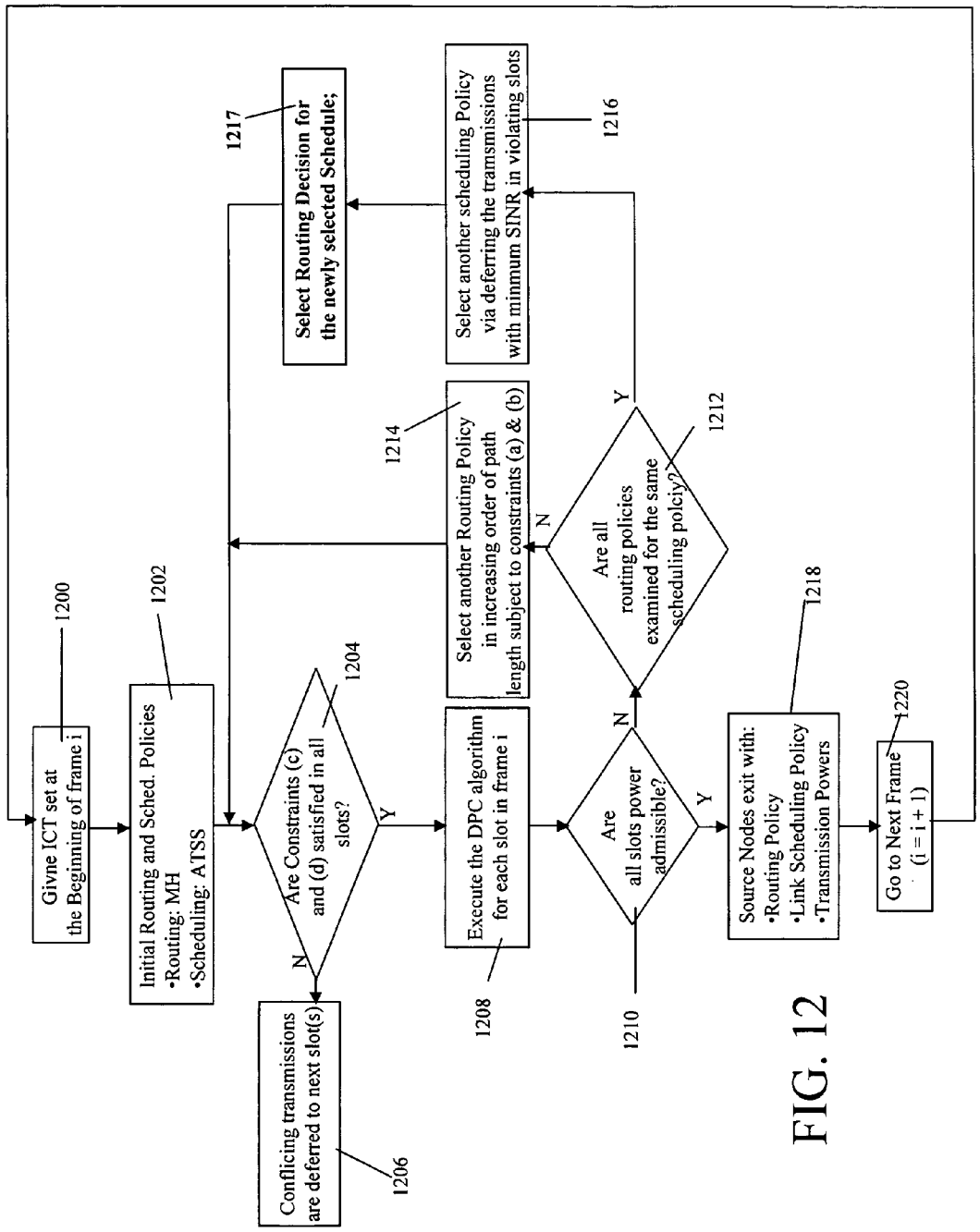
FIG. 12 is an exemplary flow diagram for a routing, scheduling, and power algorithm in accordance with the present invention.

The cross-layer approach to the MAC and routing problem in wireless ad-hoc networks proposed by the present invention includes the joint routing, scheduling, and power control (RSP) method illustrated in FIG. 12 that resolves the problem within each ICT set (the "intra-set" algorithm), and investigates the problem of set coordination necessary to resolve inter-set interference (overlapping). The method illustrated in FIG. 12 attempts to find a near-optimal solution for equation (3) within each ICT set. The method determines the set of single-hop links, along with the slot assignments and transmission powers that can safely transmit in each slot without disrupting each others' transmission. Accordingly, the algorithm determines the next-hop for each source node, decides which link should be activated in which slot, and specifies the set of powers needed in order to satisfy the SINR constraints at respective receivers. In the case of $M_k=1$, the proposed algorithm reduces to the simple case where the MAC and routing decisions are decoupled due to the absence of interference. That is, if the number of transmitters in the ICT set under investigation $M_k=1$, then it implies that this transmitter is spatially separated from other transmitters and it can be handled independently from all other transmitters. In fact, under such a scenario the proposed algorithm reduces to the simple case of separate routing and MAC decisions due to the absence of multi-user interference. For instance, the algorithm could base the routing decision on the simple MH criteria, and provide a separate decision for scheduling in the first slot in the frame on the transmission of the node. Finally, the transmission power selected should guarantee a minimum level of Signal-to-Noise Ratio (SNR) at the next-hop. Hence, there would be no need for a Distributed Power Control (DPC) algorithm due to the lack of interference within a set.

The essence of the RSP algorithm illustrated in FIG. 12 is to search for a routing and scheduling policy that achieves near-optimal path length and MAC throughput respectively while guaranteeing convergence of the DPCs to the minimum power vector in each slot in the frame. Thus, the routing and scheduling portions of the algorithm are search-based, whereas DPC is an iterative procedure that generally converges in exponential time to the minimum power vector, if one exists. Hence, techniques for speeding up the routing and scheduling search process should be sought, such as reducing search overhead by guiding the search process in the policy space in order to quickly reach a near-optimal solution. Accordingly, the present invention gives precedence for examining routing policies over scheduling policies. More specifically, the present invention examines all routing policies for each scheduling policy for a solution. If none found, it examines another scheduling policy. The rationale behind this is to resolve multi-user interference by separating the receivers of various links (i.e., next-hops) before having to defer transmission to next slots or frames. This approach is in line with the objective of maximizing the single-hop throughput since, for each slot, the algorithm tries to examine all routing policies before deferring transmissions. The routing search process commences with the MH policy since minimizing the average path length is a desirable criterion in the solution. If there are multiple minimum hop paths, the algorithm resolves the tie through random selection.

The examination order of the routing policy stems from the fact that neighbors of a source node differ in the length of the path on which they reside, and in the amount of interference to which they are exposed. Thus, it is evident that searching the routing policy space blindly is expected to be time consuming and inefficient. This is attributed to the fact that blind search does not exploit the differences between neighbors. Thus, it could be argued that neighbors of each source node that satisfy constraint (b) in equation (3), along with the loop-freedom constraint, should be ordered according to their average path lengths to destination, such that neighbor(s) on minimum-hop path(s) are examined first and neighbors on longer paths are examined later. This ranking is instrumental in guiding the search process across the routing policy space to find good sub-optimal solutions quickly.

The scheduling search process commences with the "All Transmissions in a Single Slot" (ATSS) policy since maximizing the MAC throughput is desirable in the solution. Thus, the method examines the ATSS policy first, whereas it examines policies that tend to distribute transmissions evenly among slots in the later frame. The rationale behind this choice is to pack as many transmissions as possible in a slot in order to maximize the MAC throughput. If this leads to empty slots in the frame, then the generated schedule, or part of it, generally repeats using the next packets in the queues that are ready for transmission. Picking a new scheduling policy is done using the heuristic in the previously mentioned article by ElBatt et al., in which the link that achieved minimum SINR in the last DPC iteration of a specific slot is shutoff, i.e. deferred to the next slot (or frame).

Once the routing and scheduling policies to be examined are decided, the distributed power control (DPC) algorithm taught in the article by ElBatt et al. may be used and executed each slot to examine the power admissibility of the scheduled set of links (i.e. SINR$\geq\gamma$). It is evident that the DPC is iterative, which constitutes a drawback. However, as stated above, in general, it converges exponentially fast to the minimum power vector, if a solution exists.

FIG. 12 presents a flowchart that demonstrates the operation and interaction of the routing, scheduling and power control portions of the algorithm. As indicated earlier, the algorithm commences with examining MH routing and ATSS scheduling, as directed by the set leader at step 1202. Accordingly, all transmitters in the set send control information to the set leader, possibly in a contention-free manner that defines the set of links. This is essential to solve the self-interference and common receiver problems. In other words, this is necessary in order to resolve the (c) and (d) constraints defined in the problem formulation (equation (3) above) by deferring some transmissions to future slots in the frame. Accordingly, the set leader node examines constraints (c) and (d) in equation (3) for all slots in the frame to determine at step 1204, if there is any self-interference or multiple transmissions to the same receiver arising in any slot. If one or both constraints are violated at step 1204, the scheduling algorithm defers conflicting transmissions to a future slot at step 1206. This may use a simple heuristic approach, the non-limiting examples of which include the above mentioned article by ElBatt et al. Otherwise, the algorithm proceeds to the power control portion at step 1208 with a set of single-hop links assigned to a number of slots in the frame. The DPC algorithm is responsible for investigating the power admissibility of the set of single-hop links in each slot (constraints (e) and (f) in (3)) in frame i. A non-limiting example of a typical DPC algorithm that may be used with the present invention is taught by J. Foschini et al., in an article titled "A simple Distributed Autonomous Power Control Algorithm and its Convergence," IEEE Transactions on Vehicular Technology, Vol. 42, No. 4, November 1993, the entire disclosure of which is incorporated herein by reference. Notice that the operation of DPC requires receivers to send their SINR measurements back to their respective transmitters, at the end of each iteration. The receivers use a separate feedback channel in a contention-free manner to accomplish this since the feedback messages are typically small compared to data packets. If all slots turn out to be power-admissible at step 1210, then the algorithm exits at steps 1218 and 1220 with the routing, scheduling and power control solutions. Otherwise at step 1210, the algorithm selects another routing and/or scheduling policy for examination for power admissibility at steps 1212, 1214, 1216, and 1217.

Motivated by the observation that routing could circumvent the negative impact of interference without deferring transmissions to future slots, the present invention gives precedence to examining routing policies at steps 1212 and 1214 over scheduling policies at step 1216. More specifically, for a scheduling policy under examination, the algorithm examines all routing policies at step 1214 that satisfy constraints (a) and (b) in equation (3) that are also loop-free until either a solution is found or another scheduling policy at step 1216 is examined. One basis for this approach is that routing could reduce interference, like scheduling, yet without sacrificing the MAC throughput. Notice that deferring the link(s) with minimum SINR in the last DPC iteration of violating slot(s) as an attempt to lower the level of multi-access interference generates a new scheduling policy from an existing one. This can allow the remaining links to rapidly converge to the minimum power vector.

It is evident from above that ICT sets could be overlapping, i.e., one or more source nodes may belong to multiple ICT sets as illustrated in FIG. 7. Any two ICT sets denoted $ICT_X$ and $ICT_Y$ are said to be non-overlapping if-and-only-if (IFF) $ICT_X \cap ICT_Y = \emptyset$ (null), otherwise, they are overlapping. Set overlapping constitutes inter-set interference, which leads to coupling different ICT sets. The joint routing, scheduling and power control algorithm described above can be executed simultaneously for non-overlapping ICT sets, since they are independent and the transmissions in one set would cause negligible interference at the receivers of the other set(s). However, simultaneous execution of the intra-set operation algorithm is not possible for multiple overlapping sets. Executing the RSP algorithm for these sets simultaneously is problematic since source node(s) in the overlapped area would receive conflicting orders from respective set leaders. This is equivalent to merging the two sets into a larger set, however, the leaders of the original sets are not aware of the merger, and each leader is trying to find a solution for its set only. One way to circumvent this hurdle is to enable the merged sets to somehow detect the overlap and then elect a new leader for the larger set that runs a single RSP algorithm. However, executing RSP for larger sets (i.e., sets with more S-D pairs) implies higher computational overhead due to larger routing and scheduling policy spaces. Moreover, it could lead to merging a chain of ICT sets into a single set that is hard to solve. Furthermore, the larger set contradicts one of the fundamental premises of the present invention in that spatially distant transmitters whose mutual interference is negligible should belong to different sets.

Figure 13:
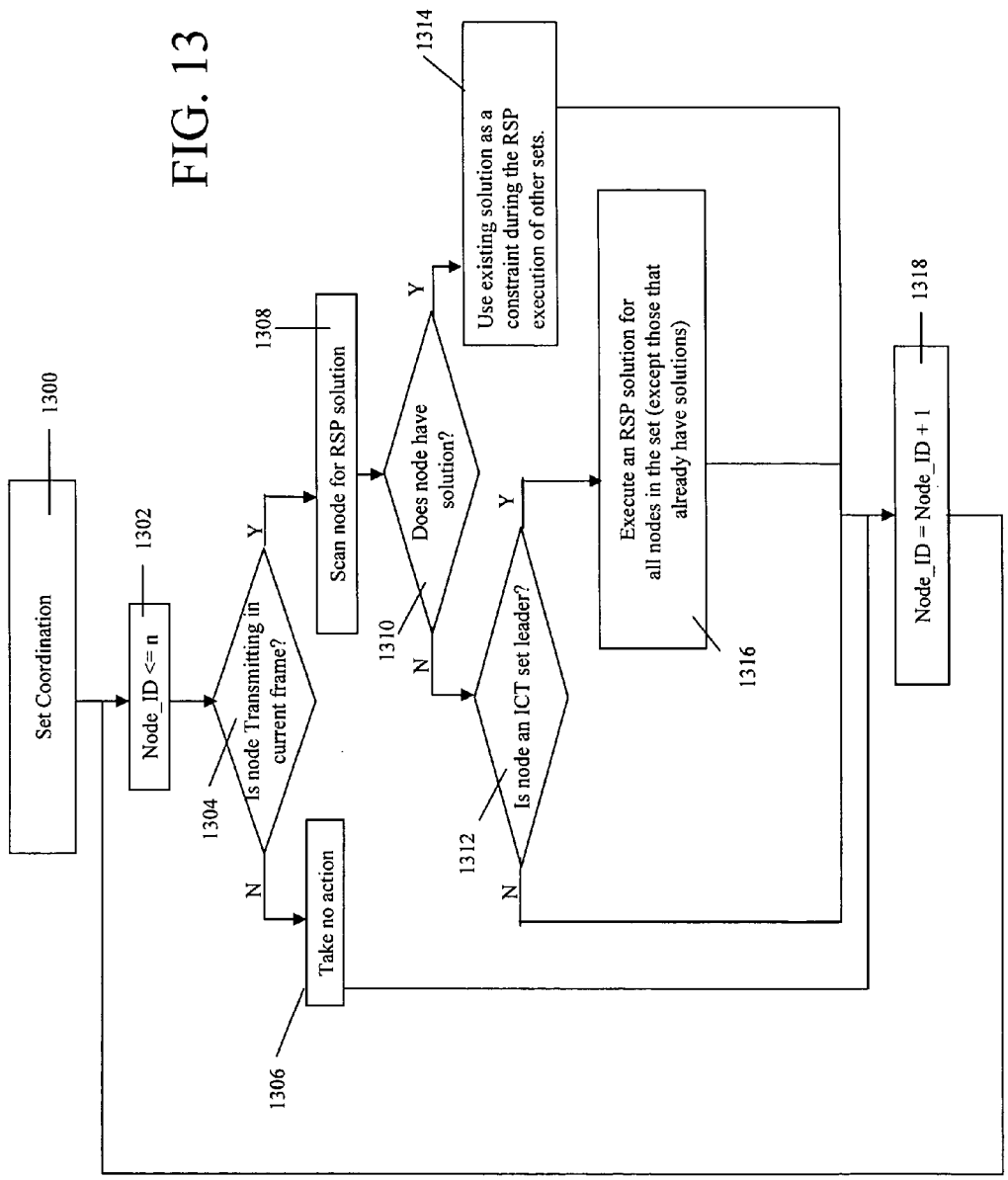
FIG. 13 is an exemplary flow diagram for set coordination in accordance with the present invention.

As illustrated in FIG. 13, the present invention provides an alternative approach that avoids the set merging phenomena via the notion of set scheduling (or coordination) carried out in the control sub-frame. Thus, the present invention addresses the problem of how to coordinate the execution of the RSP algorithm for different ICT sets subject to i) RSP being executed for overlapping ICT sets at different times, and ii) RSP for non-overlapping ICT sets being executed simultaneously. The latter constraint is attributed to the independence of the RSP solutions for non-overlapping sets. The problem of determining the minimum-length schedule subject to the above two constraints is a combinatorial problem that requires global information about set overlapping at a central controller. It is similar to the graph-coloring problem encountered in link transmission scheduling, yet with different constraints. This, in turn, renders distributed heuristic solutions unavoidable.

The proposed set coordination scheme illustrated in FIG. 13 commences at step 1300. The overall method illustrated scans all nodes n in a round-robin fashion, in ascending order of their node IDs. The method first determines at step 1304 if a node with a node ID less than or equal to K is transmitting. A node that is not transmitting in the current frame takes no action as illustrated in step 1306, and the method moves on to the next node at step 1318. If a node is determined at step 1304 to transmit, the method scans the node for an RSP solution. If it is determined at step 1310 that a RSP solution exists, then at step 1314 the method uses the existing solution as a constrain during the RSP execution of other sets, and move on to the next node at step 1318. The leader of an ICT set at 1316 executes the RSP algorithm in its turn. Accordingly, all ICT sets execute sequentially irrespective of their overlap. If a scanned node at step 1308 is determined at step 1310 not to have an RSP solution, the method determines if the node is an ICT set leader at step 1312. If the node is an ICT set leader, then the method at step 1316 executes the RSP solution for all nodes in the set (except those that already have solutions). A source node that belongs to multiple ICT sets is resolved with the RSP execution of the first set, reaching its turn at step 1314. Afterward, its solution is handled as given (or constraint) during the RSP execution of the other sets at step 1316. This represents an essential feature of this scheme, which resolves inter-set interference without merging overlapped sets.

(6) Results

Figure 15:
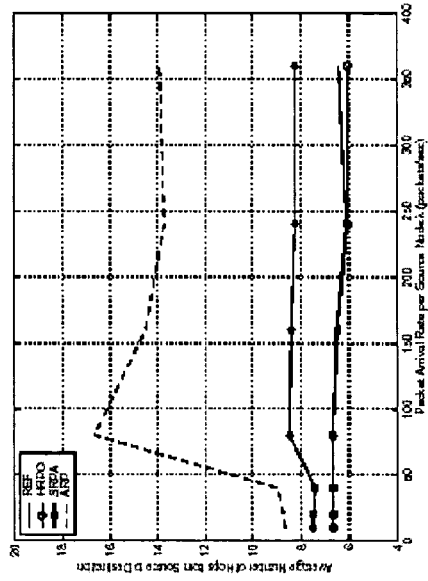
FIG. 15 is an exemplary graph illustrating an average multi-hop path length for various routing policies in accordance with the present invention.
Figure 16:
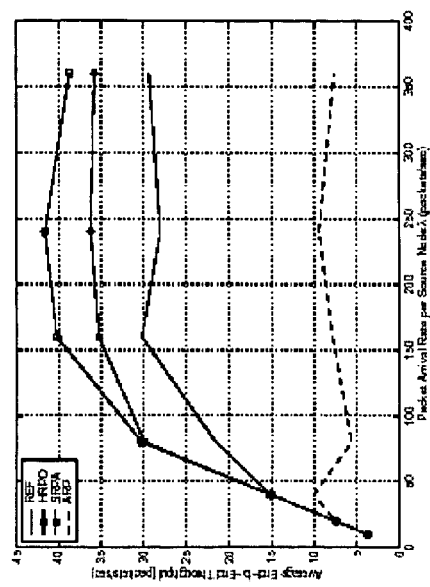
FIG. 16 is an exemplary graph illustrating an average end-to-end throughput for various routing policies in accordance with the present invention.
Figure 14:
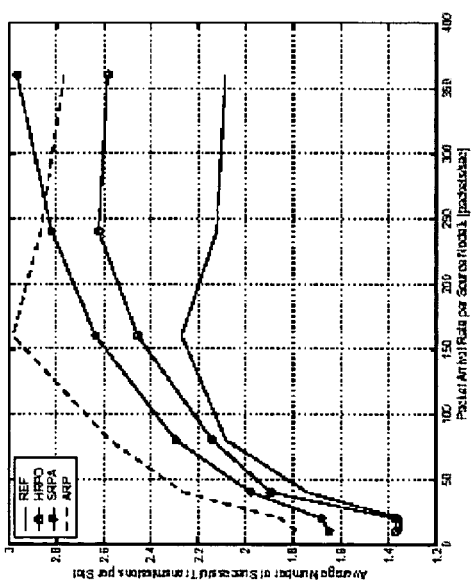
FIG. 14 is an exemplary graph illustrating an average number of successful transmissions per slot for various routing policies in accordance with the present invention.

Illustrated in FIGS. 14 to 16 are the performance results obtained via simulation. The results show the considerable performance gains of the proposed cross-layer design approach over a reference system that employs minimum-hop routing and collision-free scheduling. The present invention considered a uniform network topology with 64 fixed nodes placed across an approximately square area with sides of approximately 1000 meters. The square area was sub-divided into 64 smaller approximate squares, accommodating each node randomly within each of these squares. The simulator assumed a data packet size to be 512 bytes. The data slot duration was set to 6 milliseconds, and each frame was assumed to accommodate d=5 data slots. The maximum transmission power supported by the radio ($P_{max}$) was assumed to be 36.5 dBm. The SINR threshold for successful reception at a receiver ($\gamma$) was set to 5 dB. The simulator assumed the receiver thermal noise power to be −90 dBm. For the simulation, the DPC algorithm set the maximum number of iterations to 20. The present invention assumed three S-D pairs where source nodes are separated from their respective destinations by approximately 1000 meters, on the average, in order to emphasize the role of interference contributed by intermediate nodes on multi-hop paths. Notice that the effective number of packet senders increases from frame to frame, on the average, since next-hop nodes act as sources of forwarded packets. Network loading conditions are varied by increasing the packet arrival rate per source node (λ) from 10 packets/sec to 360 packets/sec. Each simulation lasted for 900 seconds.

The reference (REF) system used as a benchmark to gauge the performance gains achieved by the proposed joint MAC-routing algorithm assumed a fixed transmission power at $P_{max}$ and there was no provision for dynamic adaptation. In addition, it also assumed isolated (separate) routing and multiple access decisions; i.e., their mutual interaction was not considered. Each source node using the MH routing criteria executes a table-based routing protocol. Ties between multiple minimum hop paths are resolved via random selection. Once the routing decision is made for all source nodes at the beginning of each frame, it is the responsibility of the scheduling algorithm to resolve the contention among the single-hop links. Accordingly, the simulation adopts a scheduling algorithm similar to the maximal slot scheduling proposed in an article by I. Cidon et al., in a publication titled "Distributed Assignment Algorithms for Multi-hop Packet Radio Networks," IEEE Transactions on Computers, Vol. 38, No 10, pp 1352-1361, October 1989, the entire disclosure of which is incorporated herein by reference, which attempts to create collision-free schedules by satisfying the following constraints: i) a node is not allowed to simultaneously transmit and receive in the same slot, ii) a node is not allowed to receive from more than one transmitter in the same slot, and iii) a receiver should not be a neighbor of any other transmitter.

The performance metrics used to compare the proposed algorithm to the reference system is the end-to-end throughput and the average transmission power per node. The end-to-end throughput may be defined as the long-run average number of data packets that reach their respective final destinations successfully per second. This measure is computed at the end of each simulation run. In order to gain more insights about the trade-off between path length and MAC throughput, the simulation examined three policies under the cross-layer design approach. Varying the average path length constraint in equation (3) generates these policies. Recall that the routing search process in the RSP algorithm ranks minimum-hop paths in the highest rank and the rank decreases as the path length increases. Accordingly, the first policy referred to as "Highest-Rank Paths Only" (HRPO) limits the search in the routing policy space to neighbors residing on minimum hop paths. This policy typically shows performance gains only if there are multiple minimum-hop paths between some S-D pairs, which is often the case in many networks with moderate connectivity. The second policy, referred to as "Second Rank Paths Also" (SRPA), widens the search scope of the first policy to accommodate paths in the highest rank (i.e., MH path(s)) and longer path(s) in the second rank. It is evident that this policy trades path length for MAC throughput, since it considers longer paths in an attempt to improve the MAC performance. Finally, the third policy, referred to as "All Rank Paths" (ARP), is an extreme one that considers neighbors on all possible paths between the source and destination, irrespective of their associated path lengths, as potential next-hops. This is equivalent to eliminating the path length constraint in equation (3). Accordingly, the MH and ARP policies may be viewed as the extremes. At one end of the spectrum, MH routing adopted in the reference system attempts to minimize path lengths irrespective of the MAC throughput. At the other end of the spectrum, the ARP policy attempts to maximize the MAC throughput irrespective of path lengths. Simulation results confirm that neither extreme is a favorable design choice. First, the present invention compares the long-run average number of successful packet transmissions per slot under the four schemes. The importance of this experiment stems from the fact that this parameter reflects the MAC throughput. Notice from FIG. 13 that the reference system yields the lowest MAC throughput due to ignoring the negative impact MH routing may have on the MAC performance. On the contrary, the HRPO and SRPA policies show considerably higher MAC throughput. Notice that HRPO improves the MAC throughput of REF by a factor of 25% at heavy loads. It is crucial to notice that this is achieved while preserving the MH routing criteria since the HRPO policy attempts to exploit the spatial separation of next-hop nodes to pack as many transmissions as possible in each slot. Moreover, as the path length constraint in equation (3) is relaxed, the SRPA policy improves the MAC throughput of REF by a factor of 38% at heavy loads. This is attributed to enlarging the routing search space which creates more room for spatially separating the paths of various S-D pairs. Under the ARP policy, the MAC throughput increases at low to moderate loads and then starts to decrease under high loads. This is attributed to ignoring the path length constraint since routing based solely on MAC throughput could lead to forwarding packets to distant destinations. This, in turn, may lead to following arbitrarily long paths, as shown later, which imposes a higher load on the network due to the large number of intermediate packets that have not reached their final destinations. It is expected that this behavior is more severe in large networks since packets could keep wandering around under ARP for arbitrarily long times without reaching their final destinations. Next, the present invention compares the long-run average path length under the four policies as shown in FIG. 18. This measure reflects the price paid for improving the MAC throughput. It is straightforward to notice that the reference system yields the lowest average path length due to adopting the MH routing criteria. Moreover, policies that improve the MAC throughput, namely HRPO and SRPA, have average path lengths similar to or longer than the reference system. In addition, the ARP policy has the longest path length on the average as expected. FIGS. 17 and 18 confirm that the interplay between MAC throughput and path length is what determines the net end-to-end throughput. FIG. 16 shows the end-to-end throughput performance under the four policies. First, the reference system yields a low performance due to ignoring the trade-off between MAC throughput and path length. Second, the HRPO and SRPA policies give the highest end-to-end throughput due to improving the MAC throughput subject to a constraint on the path length. Third, the ARP policy yields the worst throughput performance due to following spatially far and excessively long, paths from source to destination. Finally, we notice that the HRPO policy outperforms the reference system by a factor of 50% at heavy loads and decreases to 35% at moderate loads. On the other hand, the SRPA outperforms the reference system by a factor of 34% for moderate and heavy loads. Thus, although the SRPA policy seems inferior to HRPO, it still outperforms the reference system. Referring to the relative performance of HRPO, SRPA, and ARP, the present invention demonstrates that there is a turning point in the behavior of the RSP algorithm that is directly related to the path length constraint. Under HRPO and SRPA, where routing is restricted to MH and slightly longer paths, there could be room for overall performance improvement as demonstrated. On the other hand, as the ARP policy is approached (by relaxing the path length constraint further), improving the MAC throughput would be over weighed by the lengthy paths followed from source to destination. Thus, the present invention shows that by appropriately setting the path length constraint, the proposed cross-layer design approach could achieve significant performance improvement over the reference system. Finally, the present invention compares the long-run average transmission power per node under the proposed cross-layer scheme to the reference scheme where all nodes use a fixed power level, namely the maximum. The simulation results reveal significant reduction in the average transmission power of a node (around six-fold reduction) for the HRPO and SRPA policies over the REF system. This may be attributed to the DPC portion of the RSP algorithm, which attempts to find the minimum power vector subject to SINR and transmission power constraints in each slot.

Although the invention has been described in language specific to structural features and or methodological steps, it is to be understood that the invention defined in the appended claims is not necessarily limited to the specific features or steps described. Rather, the specific features and steps are disclosed as preferred forms of implementing the claimed invention.

In the above detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

What is claimed is:

1. A method for interference-resilient joint MAC, routing, and power scheme, comprising the acts of:
   providing an interference-resilient wireless ad-hoc communication network with K transmitter-receiver nodes, with each node having a unique index identification 1 to K, and comprising at least one antenna that communicates through wireless medium;
   providing a cross-layer framework that includes a joint routing, scheduling, and power control of respective network layer, data link layer, and physical layer of the communication network;
   optimizing Medium Access Control sub-layer (MAC) throughput of the data link layer as follows:

$$\max_{NH,SL,P_t} \eta_{mac}$$

where
   K is an integer;
   $\eta_{mac}$ is the MAC throughput;
   NH constitutes a routing decision;
   SL constitutes a scheduling decision; and
   $P_t$ constitutes a power control decision;
wherein $$\max_{NH,SL,P_t} \eta_{mac}$$

is determined by
   constructing interference coupled transmitter sets (ICTs) to explicitly account for interference among transmitters that are within a number of hops distant from a node;
   resolving intra-set interference within ICT sets; and
   resolving inter-set interference among different ICT sets.

2. A method for interference-resilient joint MAC, routing, and power scheme as set forth in claim 1, wherein the MAC throughput is measured as an average number of successful transmissions per slot.

3. A method for interference-resilient joint MAC, routing, and power scheme as set forth in claim 2, wherein the act of optimizing is subject to routing decision constraints,

| | |
|---|---|
| (a) $NH(S_k) \in N(S_k)$ | $\forall S_k$ |
| (b) $L \leq \beta$ | $\forall S_k$ | with the constraint (a) indicating that a next-hop transmission of any source should be among the source's neighbors, and constraint (b) limiting a routing decision space to include only source-destination paths of length no greater than a threshold $\beta$, and
where
   $S_K$ is a source node K
   $NH(S_K) = \{NH(S_1), NH(S_2), \ldots, NH(S_K)\}$ is a vector of next-hop nodes for all source nodes;
   L is a length of a path from $S_k$ to $D_k$ passing through $NH(S_k)$ measured in number of hops and averaged over all source-destination pairs;
   $\beta$ is an upper bound on an average path length; and
   $N(S_k)$ is a set of single-hop neighborhood node K.

4. A method for interference-resilient joint MAC, routing, and power scheme as set forth in claim 3, wherein the routing decision is constrained to include only loop-free paths.

5. A method for interference-resilient joint MAC, routing, and power scheme as set forth in claim 4, wherein the act of optimization is subject to scheduling decision constraints,

| | |
|---|---|
| (c) $SL_k = SL_j \Rightarrow NH(S_k) \neq S_j$ and $NH(S_j) \neq S_k$ | $\forall k,j$ |
| (d) $SL_k = SL_j \Rightarrow NH(S_k) \neq NH(S_j)$ | $\forall k \neq j$ | with the constraint (c) eliminating a possibility of simultaneous transmission-reception by a node, and the constrain (d) eliminating multiple simultaneous transmission to a single, common receiver in any generated schedule, and
where
   $S_j$ is a source node j;
   $NH(S_j)$ is a next-hop of source node $S_j$ as determined by the routing decision;
   $SL = \{SL_1, SL_2, \ldots, SL_K\}$ is a vector of slot indexes assigned to various links;
   $SL_k$ is slot assigned to link K; and
   $SL_j$ is slot assigned to link j.

6. A method for interference-resilient joint MAC, routing, and power scheme as set forth in claim 5, wherein the act of optimizing is further subject to power control decision constraints,

| | |
|---|---|
| (e) $SINR_k \geq \gamma$ | $\forall S_k$ |
| (f) $0 \leq P_{tk} \leq P_{max}$ | $\forall S_k$ | with the constraint (e) conditioning for successful reception, and the constraint (f) representing a peak power constraint per node, and where $SINR_k$ is a signal-to-interference-and-noise ratio at a receiver of $S_k$, of $NH(S_k)$;

$\gamma$ is a minimum requirement on the SINR dictated by an upper bound on a bit error rate necessary for successful reception;

$P_{tk}$ is power transmitted by source node K; and $P_{max}$ is maximum power that could be transmitted by a node.

7. A method for interference-resilient joint MAC, routing, and power scheme as set forth in claim 6, wherein the conditioning for successful reception is construed as a power admissibility condition.

8. A method for interference-resilient joint MAC, routing, and power scheme as set forth in claim 7, wherein the act of constructing of ICT sets is on a frame-by-frame basis, with each frame constituting a unit of exchange for the data link layer.

9. A method for interference-resilient joint MAC, routing, and power scheme as set forth in claim 8, wherein the act of constructing of the ICT sets comprises:

identifying the number of nodes of the ad-hoc communication network;

determining if a node has a packet to transmit in a current frame; and if it is determined that the node has a packet to transmit, informing nodes within a pre-determined distance of a required transmission, through limited H hop flooding, that the node has a packet to transmit, with H represents a number of nodes distant from the node that has a packet to transmit; and if it is determined that the node has no packet to transmit in the current frame, a next node is identified to determine if the next node has a packet to transmit.

10. A method for interference-resilient joint MAC, routing, and power scheme as set forth in claim 9, wherein the act of resolving intra-set interference comprises:

(I) selecting an initial routing decisions that meet constraints (a) and (b);

(II) selecting a scheduling decisions;

(III) determining if constraints (c) and (d) are met;

(IV) if it is determined that constraints (c) and (d) are not met, deferring conflicting transmissions to next slots;

if it is determined that the constraints (c) and (d) are met, executing a Distribution Power Control (DPC) process for each slot in the current frame, and determining if all slots are power admissible;

if it is determined that all slots are power admissible, selecting a next frame for assignment of routing, scheduling, and power for the next frame;

if it is determined that the power admissibility condition is not satisfied, determining if all routing decisions are examined for the same scheduling decision;

if it is determined that all routing decisions are not examined for the same scheduling decision, selecting another routing decision for the same schedule, in increasing order of path length, subject to the constraints (a) and (b), and performing acts (III) to (IV);

if it is determined that all routing decisions are examined for the same scheduling decision, selecting another scheduling decision by deferring a transmission within minimum Single-Interference-Noise-Ratio (SINR) in violating slots, and selecting a new routing decision for a newly selected schedule, and performing acts (III) to (VI).

11. A method for interference-resilient joint MAC, routing, and power scheme as set forth in claim 10, wherein resolving inter-set interference comprises:

executing routing, scheduling, and power control solution for overlapping ICT sets at different times and executing non-overlapping ICT sets simultaneously.

12. A method for interference-resilient joint MAC, routing, and power scheme as set forth in claim 11, wherein resolving inter-set interference further comprises:

scanning all nodes within the network;

if it is determined that a scanned node is not transmitting, selecting a next node within the network;

determining if a scanned, transmitting node has a solution for routing, scheduling, and power control for the respective network, data link, and physical layers;

if it is determined that the solution exists, using that solution as a constraint and selecting a next node within the network;

if it is determined that the solution does not exist, then determining if the scanned, and transmitting node is a leader of the ICT set;

If it is determined that the scanned, transmitting node with no solution is not a set leader, selecting a next node within the network;

if it is determined that the scanned, transmitting node has a solution and is a set leader, executing a routing, scheduling, and power control solution for nodes within the leader's set, with the exclusion of nodes that already have a solution, and selecting a next node within the network.

13. A method for interference-resilient joint MAC, routing, and power scheme for a wireless ad-hoc communication network, comprising the acts of:

providing a cross-layer framework that includes a joint routing, scheduling, and power control of respective network layer, data link layer, and physical layer of the communication network that considers interference to optimize Medium Access Control (MAC) throughput $$\max_{NH,SL,P_t} \eta_{mac}$$

by:

constructing interference coupled transmitter sets (ICTs) to explicitly account for interference among transmitters that are within a number of hops distant from a node;

resolving intra-set interference within ICT sets; and resolving inter-set interference among different ICT sets;

where $\eta_{mac}$ is the MAC throughput;

NH constitutes a routing decision, which determines a best hop for transmission of a signal from each source node on the signal's route to a final destination node;

SL constitutes a scheduling decision, which determines a slot assigned for establishing a link between each source node and the source node's respective next-hop; and $P_t$ constitutes a power control decision, which determines a transmission power used by the source node to guarantee successful reception at the next-hop.

14. A method for interference-resilient joint MAC, routing, and power scheme for a wireless ad-hoc communication network, as set forth in claim 13, wherein the act of constructing interference coupled transmitter sets (ICTs) comprises:

identifying the number of nodes of the ad-hoc communication network on a frame-by-frame basis, with each frame constituting a unit of exchange for the data link layer;

determining if a node has a packet to transmit in a current frame; and if it is determined that the node has a packet to transmit, informing nodes within a pre-determined distance of a required transmission, through limited H hop flooding, that the node has a packet to transmit, with H represents a number of nodes distant from the node that has a packet to transmit; and if it is determined that the node has no packet to transmit in the current frame, a next node is identified to determine if the next node has a packet to transmit.

15. A method for interference-resilient joint MAC, routing, and power scheme for a wireless ad-hoc communication network as set forth in claim 14, wherein the act of resolving intra-set interference within ICT sets, comprises:

(I) selecting an initial routing decision, which is constrained to include only loop-free paths, and further having constraints

| | |
|---|---|
| (a) $NH(S_k) \in N(S_k)$ | $\forall S_k$ |
| (b) $L \leq \beta$ | $\forall S_k$ | with the constraint (a) indicating that a next-hop transmission of any source node should be among the source node's neighbors, and constraint (b) limiting a routing decision space to include only source-destination paths of length no greater than a threshold $\beta$;

(II) selecting a scheduling decisions with constraints

| | |
|---|---|
| (c) $SL_k = SL_j \Rightarrow NH(S_k) \neq S_j$ and $NH(S_j) \neq S_k$ | $\forall k,j$ |
| (d) $SL_k = SL_j \Rightarrow NH(S_k) \neq NH(S_j)$ | $\forall k \neq j$ | with the constraint (c) eliminating a possibility of simultaneous transmission-reception by a node, and the constrain (d) eliminating multiple simultaneous transmission to a single, common receiver in any generated schedule;

(III) determining if constraints (c) and (d) are met;

(IV) if it is determined that constraints (c) and (d) are not met, deferring conflicting transmissions to next slots;

if it is determined that the constraints (c) and (d) are met, performing a Distribution Power Control (DPC) process for each slot in the current frame, and determining if all slots are power admissible by ascertaining if power control decision constraints

| | |
|---|---|
| (e) $SINR_k \geq \gamma$ | $\forall S_k$ |
| (f) $0 \leq P_{tk} \leq P_{max}$ | $\forall S_k$ | are met, with the constraint (e) representing conditioning for successful reception, and the constraint (f) representing a peak power constraint per node;

if it is determined that all slots are power admissible, selecting a next frame for assignment of routing, scheduling, and power for the next frame;

if it is determined that the power admissibility condition is not satisfied, determining if all routing decisions are examined for the same scheduling decision;

if it is determined that all routing decisions are not examined for the same scheduling decision, selecting another routing decision for the same schedule, in increasing order of path length, subject to the constraints (a) and (b), and performing acts (III) to (IV);

if it is determined that all routing decisions are examined for the same scheduling decision, selecting another scheduling decision, subject to constraints (c) and (d), by deferring a transmission within minimum Single-Interference-Noise-Ratio (SINR) in violating slots, and selecting a new routing decision, subject to the constraints (a) and (b), for a newly selected schedule, and performing acts (III) to (IV); and where $S_K$ is a source node K $NH(S_K) = \{NH(S_1), NH(S_2), \ldots, NH(S_K)\}$ is a vector of next-hop nodes for all source nodes;

L is a length of a path from $S_k$ to $D_k$ passing through $NH(S_k)$ measured in number of hops and averaged over all source-destination pairs;

$\beta$ is an upper bound on an average path length;

$N(S_k)$ is a set of single-hop neighborhood node K;

$S_j$ is a source node j;

$NH(S_j)$ is a next-hop of source node $S_j$ as determined by the routing decision;

$SL = \{SL_1, SL_2, \ldots, SL_K\}$ is a vector of slot indexes assigned to various links;

$SL_k$ is slot assigned to link K;

$SL_j$ is slot assigned to link j;

$SINR_k$ is a signal-to-interference-and-noise ratio at a receiver of $S_k$, of $NH(S_k)$;

$\gamma$ is a minimum requirement on the SINR dictated by an upper bound on a bit error rate necessary for successful reception;

$P_{tk}$ is power transmitted by source node K; and $P_{max}$ is maximum power that could be transmitted by a node.

16. A method for interference-resilient joint MAC, routing, and power scheme for a wireless ad-hoc communication network, as set forth in claim 15, wherein the act of resolving inter-set interference comprises:

performing routing, scheduling, and power control solution for overlapping ICT sets at different times and executing non-overlapping ICT sets simultaneously, where the performing act of routing, scheduling, and power control solution for overlapping ICT sets comprises:

scanning all nodes within the network;
  if it is determined that a scanned node is not transmitting, selecting a next node within the network;
  determining if a scanned, transmitting node has a solution for routing, scheduling, and power control for the respective network, data link, and physical layers;
  if it is determined that the solution exists, using that solution as a constraint and selecting a next node within the network;
  if it is determined that the solution does not exist, then determining if the scanned, and transmitting node is a leader of the ICT set;
  If it is determined that the scanned, transmitting node with no solution is not a set leader, selecting a next node within the network;
  if it is determined that the scanned, transmitting node has a solution and is a set leader, executing a routing, scheduling, and power control solution for nodes within the leader's set, with the exclusion of nodes that already have a solution, and selecting a next node within the network.

* * * * *